United States Patent [19]

Noponen et al.

[11] 4,088,310

[45] May 9, 1978

[54] APPARATUS FOR SUSPENSION SMELTING OF FINELY-GRAINED OXIDE AND OR SULFIDE ORES AND CONCENTRATES

[75] Inventors: Veikko H. Noponen; Simo A. Mäkipirtti, both of Harjavalta; Rolf E. Malmström, Pori; Tapio Kalevi Tuominen, Pori; Olavi August Aaltonen, Pori; Kauko Johannes Kaasila, Haukilahti; Toivo Adrian Toivanen; Seppo Untamo Harkki, both of Harjavalta; Toivo Isak Niemelä, Otaniemi, all of Finland

[73] Assignee: Outokumpu Oy, Finland

[21] Appl. No.: 703,666

[22] Filed: Jul. 8, 1976

Related U.S. Application Data

[63] Continuation of Ser. No. 519,638, Oct. 31, 1974, abandoned, which is a continuation of Ser. No. 289,634, Sep. 18, 1972, abandoned.

[30] Foreign Application Priority Data

Sep. 19, 1971 Finland ............................ 2610/71

[51] Int. Cl.² ................................ C22B 1/02
[52] U.S. Cl. .................... 266/162; 266/161
[58] Field of Search .............. 75/9, 23, 26, 40, 46, 75/72, 74; 266/161–162

[56] References Cited

U.S. PATENT DOCUMENTS

| 3,554,515 | 1/1971 | Tonooka et al. ............... 266/137 |
| 3,790,366 | 2/1974 | Bryk et al. ................... 75/23 |

Primary Examiner—Roy Lake
Assistant Examiner—Paul A. Bell
Attorney, Agent, or Firm—Cushman, Darby & Cushman

[57] ABSTRACT

A suspension smelting furnace is disclosed for the suspension smelting of finely-grained oxide or sulfide ores and concentrates, and provided with a horizontal lower furnace to which have been connected the lower ends of at least one vertical suspension reaction zone and rising flow zone, with devices at the upper end of the suspension reaction zone for the production of a suspension of finely-grained oxide and sulfide ores or concentrates with air and oxygen, and for feeding this suspension downwards in the reaction zone at the lower end of which there are optionally means for the sulifidization or reduction of the suspension, and in the lower furnace under the suspension reaction zone there is the main smelt reaction zone in which the bulk of the suspension dissolves vertically in the smelt accumulated in the lower furnace main reaction zone, and in the rising-flow zone there are devices for removing the remaining suspension at its upper end. In the lower furnace, between the main smelt reaction zone and the rising-flow zone, there is also a secondary smelt reaction zone in which the residual suspension may at least partially dissolve in smelt before essentially all undissolved residual suspension is fed into the rising-flow zone, and in the lower furnace there is also a separate smelt settling zone communicating at least through the smelt with the main and secondary smelt reaction zones for the separation of slag from matte and metal and provided with devices for removing slag, metal and matte from the lower furnace.

2 Claims, 31 Drawing Figures

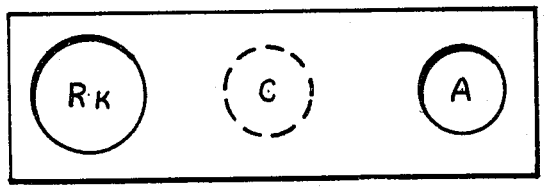
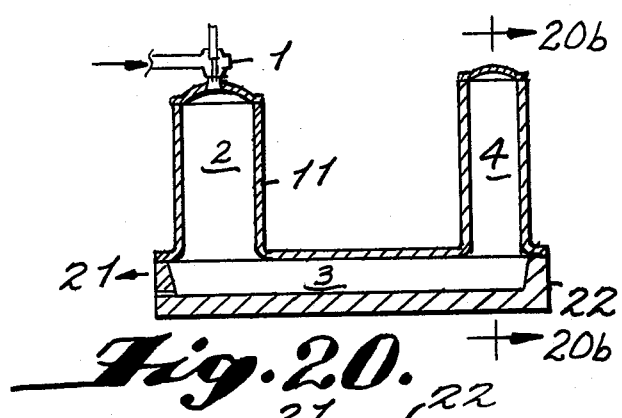
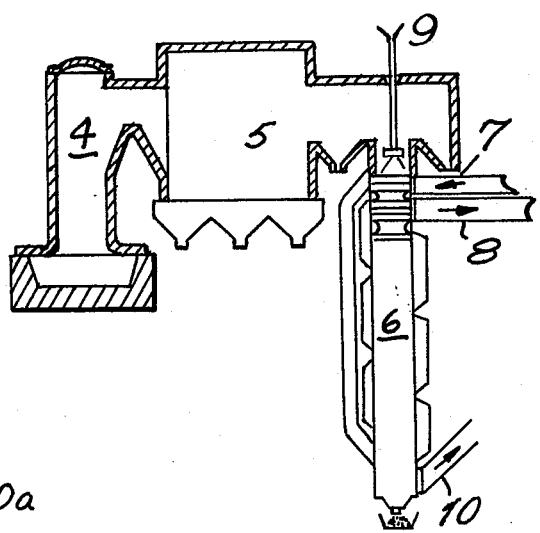
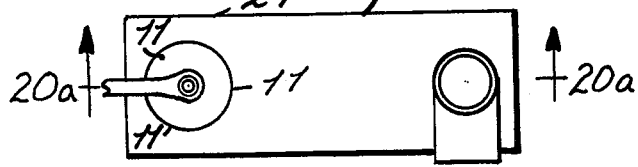

Fig. 11    Fig. 12    Fig. 13
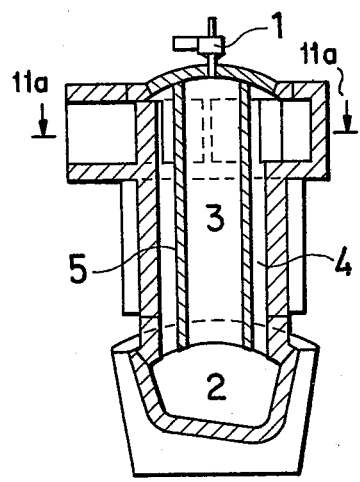
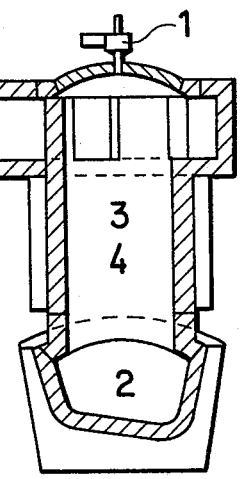
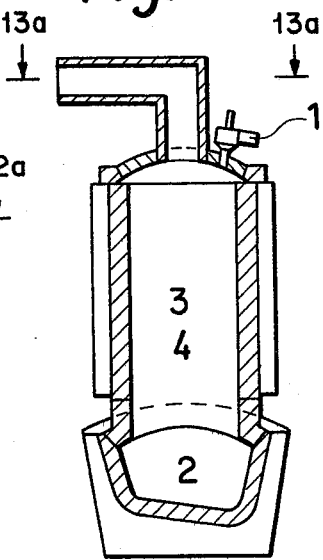
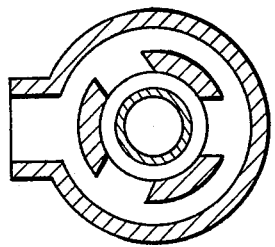
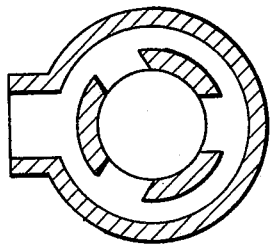
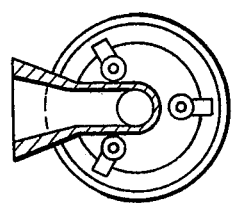
Fig. 11a.    Fig. 12a.    Fig. 13a.

EXAMPLES I AND II

EXAMPLES II AND IV

APPARATUS FOR SUSPENSION SMELTING OF FINELY-GRAINED OXIDE AND OR SULFIDE ORES AND CONCENTRATES

CROSS-REFERENCE TO RELATED APPLICATIONS

This application is a Rule 60 continuation of Ser. No. 519,638 now abandoned, filed Oct. 31, 1974, which in turn is a Rule 60 continuation application of Ser. No. 289,634, filed Sept. 18, 1972.

BACKGROUND OF THE INVENTION

1. Field of the Invention

This invention relates to an apparatus for the suspension smelting of finely-grained oxide and/or sulfide ores and concentrates.

2. Prior Art

In this connection it must first be noted that literature usually gives very little information concerning the solid and smelted materials carried along in a suspension by gas flows in smelting furnaces and other corresponding pyrometallurgical processing units. Furthermore, the available information usually relates to the amount and separation of dusts emerging from the apparatus but very seldom to the behaviour of the sediments of material inside the apparatus and their effect on the process.

In the conventional reverberatory furnaces which are used in mass production of sulfide processing and which can be considered a distant origin of the actual suspension smelting systems, a considerable part is played in dust formation. In order to eliminate dust formation in these appaaratuses, hot feeding is replaced by wet feeding which prevents the entrance into the apparatus of very fine, dust-producing material formed particularly in the roasting process. The latest development in reverberatory furnace systems is the so-called Worcra smelting system (West-German Pat. No. 1,533,061 or Canadian Pat. No. 814,926). In order to reduce the amount of dust, this process uses pellets or agglomerates of a concentrate mixture instead of loose concentrates. In regard to the conventional reverberatory furnace smelting, the feeding method has also been changed for the same reason so that the previous feeding along the walls over almost the entire length (60–80%) of the furnace has been replaced by feeding within a zone in the middle part of the furnace usually consisting of less than 30% in the furnace length. In spite of these changes, the amount of dust (flying dust) is still about 3% of the weight of the feed. It can be supposed that, especially in a linear reverberatory furnace type, even a great amount of dust suspended in the gas phase will not, in the form of a furnace sediment, cause considerable increase in the valuable metal content of the slag because the gas phase will carry the dust along when it moves over the feeding bed. The valuable metal content and its increase in reverberatory furnace slag is thus mainly due to the flow phenomena caused by the system itself or by the feeding of additional materials — for example, converter-slag feed. The actual difficulties due to the dissolution of the suspension, dust sedimentation inside the furnace systems, and high amounts of flying dust are created when using actual suspension smelting systems.

In the suspension smelting process developed by the International Nickol Company (U.S. Pat. No. 2,668,107), in which horizontal spraying is used, great amounts of dust are eliminated by adjusting the concentrate granule size suitable for the process so that the granules are considerably large (U.S. Pat. No. 2,668,107, granule size between 95%/−65 mesh and 50%/−200 mesh, and B.D.P. 840 441, granule size between 95%/−65 mesh and 5%/−200 mesh). Owing to horizontal burning, the amount of dust which sediments inside the system of the said process is so great that even when rough concentrate is used the slag obtained from the furnace is so rich in valuable metals that its after-treatment has been combined with the main process. Concentrate is produced in the process by suspension smelting matte (a/57.65% Cu and 3.03% Ni, and b/6.95% Cu and 33.77% Ni) during the first operation period — for example, 6 hours. After the removal of the matte, the slag phase (a/0.90% Cu and 0.15% Ni, and b/0.15% Cu and 0.60% Ni) remaining in the furnace is "washed" and the valuable metals by suspension smelting pyrrolite (a/1% Ni and b/1.25% Ni) during the second operation period — for example, 1–2 hours — and not until then is disposable slag (a/0.35% Cu and 0.16% Ni, and b/0.12% Cu and 0.30% Ni) obtained and, in addition, poor matte is a side product.

It must particularly be noted that, in spite of the use of rough concentrate, the amount of flying dust in the exhaust gases is very great, about 5% of the amount of the feed, even though the gas volumes and obviously also their flowing velocities are very low owing to the pure oxygen or oxygen-rich air used in the burning of concentrate — the $SO_2$ content of the exhaust gases is 85%.

The flash smelting system developed at Outokumpu Oy and its modifications (U.S. Pat. Nos. 2,506,577 and 3,306,708) include vertical burning of suspended concentrate. In this case, when rough concentrate is used, the solid and smelted materials will not cause furnace sediment problems corresponding to those created in the horizontal process.

The valuable metal contents of the slags of the vertical process are also respectively quite low, and no special aftertreatment is usually needed unless unsuitable additional materials are either fed together with the concentrate or enter the system by other routes. The basic process (Finnish Pat. No. 22,694, U.S. Pat. No. 2,506,557) contains no mention of dusts. In the pyrite treatment process (Finnish Pat. No. 32,465, U.S. Pat. No. 3,306,708), in which sediment dust has no practical importance, the effect of the flying dust amount, about 2–3%, is also technically insignificant. In the known processes for the oxidation and reduction of suspension, the amount of dust in the indutrial-scale process is very small in comparison with the used gas amount, or 4–6% of the weight of the feed mixture. It can, however, be noted that the sediments inside the system corresponding to even these small dust amounts, obtained with relatively rough concentrates, have an effect on the valuable metal contents in the slag. However, actual dust problems appear with concentrates more finely-grained than usual; the problems being only when the vertical suspension can be made to dissolve only partially. Of new modifications of the suspension process, let us mention the Brittingham process (U.S. Pat. No, 3,460,817) in which an attempt has been made to combine the developed reverberatory furnace process producing raw copper as the final product according to the previously mentioned Worcra process, and the vertical-burning smelting process according to the Outokumpu process. Furthermore, to the system so obtained has been added (U.S. Pat. No. 3,668,107) a sulfide suspension slag wash analogous to the Inco process, but the periodical, shaftless horizontal suspension burning of the latter has been replaced by a continuous-working vertical-burning additional shaft. A smoke tower has been placed between the reaction shaft and the additonal shaft. Thus, the meeting of gas flows from opposite directions ought to make the solid or smelted materials contained in them to fall. There is no mention of the actual product sedimentation rates and flying dust amounts. Because the process has not been applied on an industrial scale, it is difficult to evaluate without any operational information the behavior of the system in regard to these factors.

According to one known process (Canadian Pat. No. 760,925), copper concentrate and additional fuel are injected with the help of compressed air (normal or rich in oxygen) inside smelted ore at a high temperature, at which time the partially oxidized concentrate is arrested in the smelt and smelts forming matte and slag. On the other hand, the additional fuel ought to burn in the smelted material, supplementing the amount of heat required for smelting the ore and, thus, the smelt should always remain at a constant temperature.

According to the process, the copper contents of the mattes are 40.5, 66.9, and 39.4%, and the copper and sulfur contents of the respective slags 0.33, 0.52, and 0.35% Cu and 0.20, 0.23, and 0.26% S. Theoretically, the known balances between the matte and the slag do not materialize with the contents given, especially in regard to sulfur. The obtained result deviates especially from results obtained from reverberatory and flash smelting furnaces. When comparing the copper contents of slags obtained by vertical suspension smelting to the values given above, it can be noted that when the burning of iron is only about 28%, the concentrate and matte contents being 27.8% and about 40% Cu, the values given are by no means rare. It does not give the ferric iron and magnetite contents of the slags so that a comparison with the flash smelting process is without foundation.

On the basis of the balances, no flying dusts are created in this known process, which is very rare in suspension processes. When drafting a heat balance on the basis of the material balances, it is noted that practically at the lowest operational temperature than can be considered, 1250° C, the obtained difference between the incoming and outgoing temperatures of the system is zero, so that according to this the used apparatus would have no heat losses (balance references $Cu_2O$ and FeO: into the system: feed mixture 960 kg/824 Mcal and kerosene 40 kg/404 Mcal, or a total of 1227 Mcal; out of the system: matte 635.4 kg/672 Mcal, slag 231.4 kg/80 Mcal, and gas phase (9.4% $SO_2$) 1025 $Nm^3$/474 Mcal, or a total of 1226 Mcal. Difference: 1 Mcal). The heat load values cannot be estimated or compared with other processes because the dimensioning of the apparatus, the delay period, and the capacity values have not been given.

Finally we will review an older suspension roasting process (U.S. Pat. No. 2,209,331), in which dust problems have been discussed more than the newer processes.

According to the process, materials containing sulfides are roasted or roasted and smelted, and the sulfur content of these materials is recovered preferably in the elemental form or in the form of gases with high $SO_2$ contents. In the process, the roasting is accomplished by dispersing a finely-grained sulfidic material into an oxidizing gas flow which consists of oxygen or oxygen-rich air. After the roasting the material is recovered either in a solid state or in the form of a molten bath. The amount of free oxygen in the oxidizing gas can be regulated so that the free oxygen is used up by oxidizing only part of the sulfur content of the sulfidic material into $SO_2$. The temperature is raised so high tha the sulfide smelts in suspension. The iron sulfides have been meant to react to a considerable degree with $SO_2$ to form iron oxide and free sulfur as soon as the oxygen has been used in the formation of $SO_2$.

The processes take place in a vertical reaction tower, in which case the following processes, among others, can be used:

— Cocurrent process: A sulfidic material and an oxidizing gas are fed downwards and the product is separated from the gases with the help of a small gas volume and low flowing velocities. The sulfidic material and the oxidizing gas are fed upwards and the velocity is adjusted so that as great a part as possible of the product is carried upward by the gas flow and separated after the tower by known methods. In this case, rough granules will fall countercurrently to the bottom of the tower and are reoxidized when needed.

— Countercurrent process: An oxidizing gas flow is fed upwards and the material to be roasted, downwards. The process is particularly suitable for sulfidic material in which the amount of extremely fine particles is not too great.

— In certain cases it is recommendable according to the process to divide the sulfidic material into different granule categories and treat each of them separately, and the most finely-grained particles preferably by a parallel flow.

The dissolution of the suspension in the process is thus mainly based on the high density of the suspension and very low gas velocities, in which case the settling circumstances mainly determined by the principle of Stokes are obviously achieved especially when using relatively rough granule distributions.

Even though the described process has mainly been meant for the roasting of iron sulfides, it can, according to the specification, also be used for the treatment of sulfides of valuable metals in the manner described above. Valuable metals Cu, Ni, and Pb are separated from the suspension either as a metal smelt (Cu, Pb), a sulfide smelt, or a powder; in the latter case other known separation processes (crushing, grinding, foaming, magnet separation, chlorination, etc.) are used for the refinement and metal separation.

The object of the present invention is to create an apparatus for the suspension smelting of very finely-grained oxide and/or sulfide concentrates by the flash smelting process into sulfide mattes with high or low valuable metal contents, the respective slags being very poor in valuable metals. The apparatus thus also allows for economical processing of finely-grained concentrates by the suspension process, and characterizing of the invention is that in the lower furnace, between the main smelt reaction zone and the rising-flow zone, there is also secondary smelt reaction zone in which the residual suspension may at least partially dissolve in smelt before essentially all undissolved residual suspension is fed into the rising-flow zone, and in the lower furnace there is also a separate smelt settling zone communicating at least through the smelt with the main and secondary smelt reaction zones for the separation of slag from matte and metal and provided with devices for removing slag, metal, and matte from the lower furnace.

SUMMARY OF THE INVENTION

According to the invention there is provided an improved suspension smelting furnace having a secondary smelt reaction zone in the lower furnace between the main smelt reaction zone and the rising-flow zone wherein the residual suspension is allowed to at least partially dissolve in the smelt before essentially all undissolved residual suspension is fed into the rising-flow zone; and a separate smelt settling zone in the lower furnace communicating at least through the smelt with the main and secondary smelt reaction zones for the separation of slag from matte and metal, and comprising means for withdrawing slag, metal, and matte from the lower furnace.

The process can be applied to all pure or mixed concentrates containing Cu, Ni, Co, Zn, Pb, Sn, etc. The smelting system allows for the use of foamed sulfide concentrates with a wide granule distribution and a very fine average granule size — for example, concentrates obtained from complex and enclosed ores and separated by grinding — which has not been possible by modifications of the suspension process so far. It is now also possible to use corresponding finely-grained, large-surfaces oxide ores and concentrates containing the said valuable metals, especially if the recently developed techniques of selective suspension sulfidizing are used simultaneously in the process.

DESCRIPTION OF THE DRAWINGS

FIG. 1a is an embodiment of a prior art apparatus for suspension smelting, of which the invention of this application is an improvement, in which figure the dotted line marked C indicated the relative position of the furnace in FIG. 1 as compared to the prior art use of furnace A.

FIG. 11 shows a side view of one modification of the shaft structure;

FIG. 11a is a cross-sectional view taken along lines B—B of FIG. 11.

FIG. 12 shows a side view of a second modification of the shaft structure;

FIG. 12a is a cross-sectional view taken along lines B—B of FIG. 12.

FIG. 13 is a side view of a third modification of the shaft structure;

FIG. 13a is a cross-sectional view taken along lines B—B of FIG. 13.

FIG. 20 is a top view of a known suspension melting furnace.

FIG. 20a is a side view of a known suspension melting furnace taken along line 20a—20a of FIG. 20.

FIG. 20b is an end view of a known suspension melting furnace taken along lines 20b—20b of FIG. 20a.

In FIG. 21a the relationship of the vertical rising flow zone to the vertical reaction zone is diametrically opposite to the arrangement of those two zones in the embodiment of the invention of FIG. 2. In particular, while the vertical reaction zone encompasses the rising flow zone in FIG. 21a, the rising flow zone encompasses the vertical reaction zone in FIG. 2.

Figures 2, 2A:
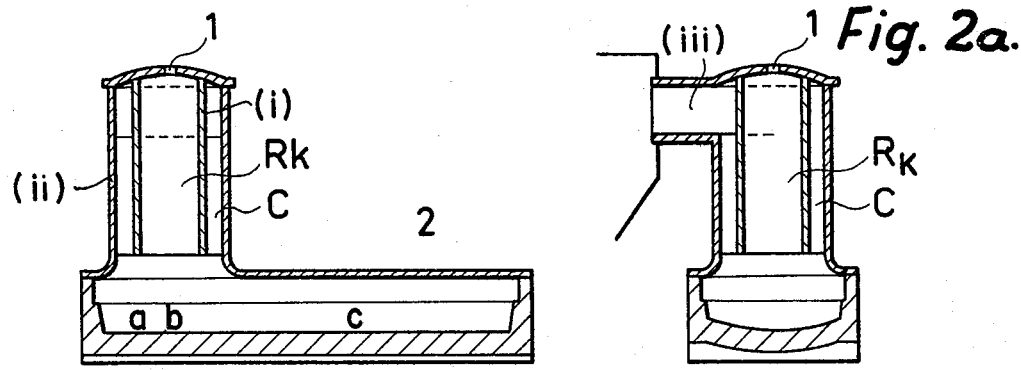
FIG. 2 shows a side view of one modification of the present invention.
FIG. 2a is an end view taken of the embodiment in FIG. 2.

(i) in the FIG. 2 refers to the vertical shaft encompassing the vertical suspension reaction zone;

(ii) in the FIG. 2 refers to a vertical shaft encompassing the rising flow zone;

(iii) in the FIG. 2 refers to means for withdrawing residual suspension from RK.

DESCRIPTION OF THE PREFERRED EMBODIMENTS

It can be noted as a general statement that with the growing scale of the flash smelting systems the oxidation and/or reduction of concentrate in a suspension is usually no longer as easy as before when the scale was small, the concentrates were rough, and their granule size distribution was narrow. With a wider granule distribution and a smaller granule size, burning, for example, which is a function of granule size, naturally takes place rather unevenly, which causes considerable disadvantages in the general course of the process. On the other hand, suspension formation techniques have developed, and burning velocities have grown after oxygen processes have not been put into use. Thus, the level of actual shaft process technology has risen, which naturally makes possible the development of technology in other parts of the system as well.

Effect of concentrate granule size factor in the flash smelting function.

In the conventional vertical burning process, the shaft product suspension produced from concentrate dissolves under the reaction shaft when the suspension changes its direction. At this time the bulk of the shaft product — the solid and liquid phases — is separated from the gas phase and settles in the reaction zone under the shaft. Most of the magnetite formed as a product of burning in this reaction zone reacts with the iron sulfide of the shaft product forming wustite (FeO) which becomes bound to solicic acid, thereby forming a slag from which the valuable metal sulfide smelt, which is poorly soluble in it, is separated as its own phase — matte. The reduction reactions can be only approximately described — iron oxides being taken here as stoichiometric — with the following equations:

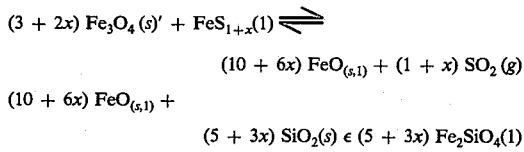

The reaction velocity of the magnetite of the reaction zone can be described by the following equation — on the basis of an empirical process simulation:

$$d_t[SO_2]/dt = K[O_t]^2[S_t],$$

in which $O_t$ and $S_t$ are the temporal kinetic activities — approximate strengths — of the oxygen and sulfur involved in the reduction, and K is the reaction velocity constant. At the falling stage of the product of burning the reaction zone is characterized by a considerable amount of solid ($Fe_3O_4(s) + SiO_2(s)$), dependent on the iron content of the matte to be produced, mixed with molten sulfide (Cu, Ni, Co, Fe — $S_x$), in which case the surface part of the reaction layer in the smelt is naturally characterized by a very high viscosity due to the solid particles. When the magnetite disappears as a result of the reduction reactions and the formed wustite is bound to silicic acid, the amount of solid material decreases, the amount of smelt increases, and its viscosity decreases, at which time the matte and the slag phases rapidly begin to separate from each other owing to the smelt solubility gap prevailing in the system.

In addition to the delay period and the activity, the reaction velocity between the solid and smelted phases is dependent on the contract area of the phases and thereby also on their particle size. In the zone below the reaction shaft, a growing particle size slows down the reduction reactions (the contact surface diminishes, the diffusion distances grow), and on the other hand the sedimentation rate of the matte through the forming silicate grows as a function of the square of the granule size (the sidimentation rate determined by the principle of Stokes in the limited sense), at which time the reduction rate also decreases when the contact possibilities decrease.

However, in the vertical process the reduction reactions usually have time to take place even when relatively rough concentrates are used. On the other hand, when finely-grained concentrates are used, a strong merging of smelt drops occurs in the zone under the shaft so that, in spite of the difference between the products of burning of rough and finely-grained concentrates, the final products in this zone do not greatly differ from each other. When the suspension proceeds in the lower furnace from the reaction shaft to the rising shaft, part of its solid and smelted material content settles on the slag surface in the lower furnace. Simultaneously, a strong granule classification takes place in the suspension as a result of the granule size and granule density of the product, in which case the ranges of the lightweight solids separated during the burning and the sulfide smelt will be different. At this time there is a great difference between the behavior of finely-grained and rough concentrates, which also leads to different changes in the slag phase. The lower furnace sediment formed from rough concentrates is relatively rough, and therefore it usually settles very close to the reaction shaft. The overoxidation of the said shaft product is also very mild so that the sulfide phase of even a continuous sedimentation usually rapidly settles into the matte layer. Owing to the short range, the contact possibilities between the oxide and sulfide particles are good so that the magnetic reduction occurs under advantageous conditions. Because the amount of sediment corresponding to rough concentrate is small, the valuable metal and secondary magnetite contents of the obtained slag phase are low and the growth of these contents is insignificant when proceeding from iron-rich to iron-poor matte.

A suspension containing finely-grained products of burning will not dissolve as easily when its direction is changed. The amount of product which settles in the reaction zone under the shaft is much greater than with a rough product of burning under equal conditions and, respectively, the amount of lower furnace sediment is great and quite evenly distributed on the lower surface. A finely-grained product of burning usually has a wide granule size distribution and, consequently, the granule size distribution of the lower furnace sediment is similar and, in addtion, strongly classified as a function of the different densities and granule sizes of the sulfides and solids. Owing to its fine granule size, the lower furnace sediment contains a great deal of overoxidized product and, respectively, less sulfide phase than usual. Though the surface area grows significantly when the granule size decreases, the actual reduction rate of magnetite decreases because, owing partially to the classification (sulfide and oxide phases in different places, etc.) and partially to overoxidation, the kinetic activities of oxygen and sulfur become disadvantageous either quantitatively or otherwise. On the other hand, owing to the small granule size, the sulfides do not sediment at a rate high enough in the slag layer. The said behavior of the sediment results in a rapid increase in the valuable metal content of the slag and an increase in the secondary magnetite amount, which are both independent of each other. When producing high-grade matte from finely-grained concentrates by the conventional process, the result is often the appearance of reduction reaction

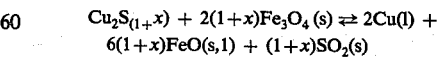

due to the overoxidation of the sediment and also its primary low sulfur content. In this case the reduced copper separates as extremely finely-grained and, owing to surface forces, round, balls — Cu cloud — with the result that it is impossible for the separated phase to sediment in the matte phase.

Mechanism of the behavior of the suspension to be processed:

The suspension to be processed by flash smelting and containing the feed concentrate and additives is subjected in the system to very many different physical and chemical influences and changes, such as a great change in volume due to the heating of the suspension in the reaction shaft and the corresponding change of velocity; the phase and state inversions of suspended particles due to oxidation reactions and respective changes in the physical and chemical properties of the gas phase; changes and disturbances in the flow due to rapid changes in the direction of the suspension and the geometry of the structure after the reaction shaft; very great changes in the concentration and density of the suspension due to the sedimentation of suspended material, etc. For the above reasons, it is very difficult to estimate the behavior of the suspension. The determination of the surfaces of the local static pressure of flowing suspension as a function of the flowing velocity and the suspension density according to the revised equation of Bernoulle generally used in the analysis of conveying systems, and the use of these velocity surfaces prevailing before and after the minimum lines for the determination of the sedimentation rates in the system is only very approximately directive and often practically useless owing to the system and the above factors. Because an analytic solution of the conveying function is not obtainable for the system, variables with the greatest influence and their effect on conveying must be experimentally investigated in each case separately.

The behavior of the suspension under circumstances corresponding to a flash smelting furnace were first investigated by sample tests and with a pilot-scale furnace, and the results thereby obtained were finally verified with an industrial-scale installation.

Figure 1:
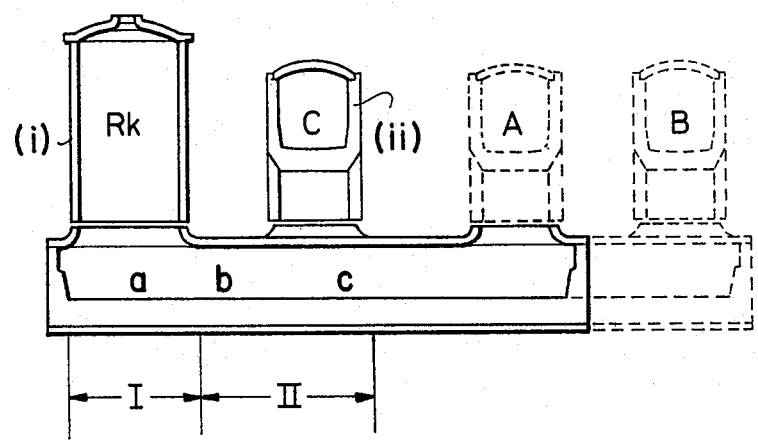
FIG. 1 shows a cross-section as seen from the side of a known suspension smelting furnace and its modifications which have been indicated by a broken line and of which modification C shows one solution according to the invention.

Some results of the experiments on the behavior of the suspension are examined below. FIG. 1 shows a side view of the furnace system involved. The starting point is furnace structure A, known as such. The other structures, B. and C, deviate from it in that, while the reaction shaft is the same in all the cases, in case B the lower furnace has been lengthened and the rising shaft has respectively been moved to position B. In structure C the lower furnace is the same as in case A, but the rising shaft has been moved to position C, in which case a structure according to the invention is obtained. In addition to these, experiments were undertaken with a structure in which the end part of the furnace consisting of the rising shaft was turned to a position perpendicular to the rest of the installation, the area of the second part of the lower furnace corresponding to that in case B. The width of the lower furnace was the same in each structure. Furthermore, it was possible to decrease the normal cross section area of the gas space of the lower furnace by 50%.

For examination of the sedimentation of the suspension, the lower furnace has been divided into zones I, II, according to FIG. 1.

In a furnace structure according to the invention in which rising shaft C has been installed in the immediate vicinity of the reaction shaft, zone I can be called the main reaction zone, zone II the secondary reaction zone, and after zone II the settling zone. Furnace C according to the invention thus deviates from known furnace A FIG. 1a among other things in that zone II has been divided into two zones, and that the rising shaft has been installed in the immediate vicinity of the reaction shaft in order to minimize the area of zone II.

Figures 3, 3A:
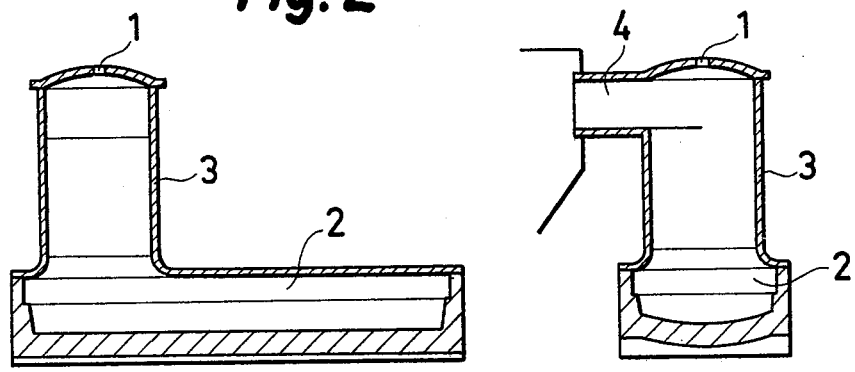
FIG. 3 illustrates a side view of a second modification of the present invention.
FIG. 3a is an end view of the embodiment of FIG. 3.
Figure 4:
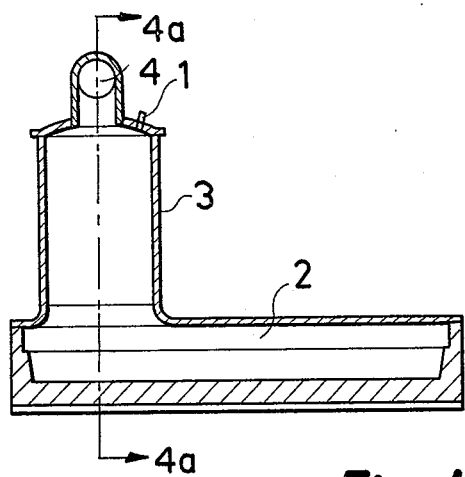
FIG. 4 illustrates a side view of a third modification of the present invention.
Figure 4A:
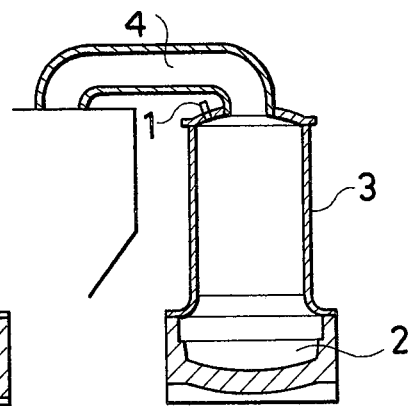
FIG. 4a is an end view taken along lines 4a—4a of FIG. 4.
Figure 21:
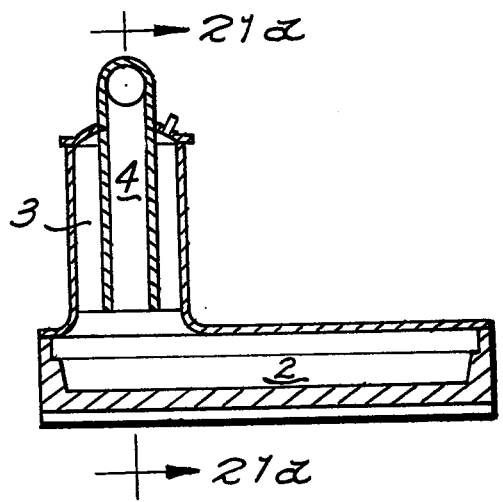
FIG. 21 is a modification of the furnace of FIG. 4 which includes a cylindrical partition wall between the reaction shaft and the rising shaft.
Figure 21A:
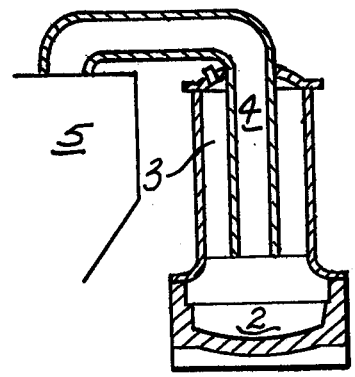
FIG. 21a is a side view taken along lines 21a—21a of FIG. 18.

The behavior of the system in extreme cases was studied with furnace structures shown in FIGS. 2–4. Rising shaft C in FIG. 1 was moved to be concentric with reaction shaft Rk, in which case a structure according to FIG. 2 was obtained in FIG. 2, the rising shaft is disposed concentrically about the reaction shaft. An alternative embodiment is set forth in FIG. 21 and FIG. 21a. In FIGS. 21 and 21a the reaction shaft is disposed about the rising shaft. Finally, the conventional rising shaft was eliminated entirely, in which case, using the structure according to FIG. 3, the suspension was fed through one disperser 1 at the central axis of the reaction zone and downwards. When using a structure according to FIG. 4, the suspension was fed into the periphery of the three reaction zones through symmetrically placed dispersers 1, in which case the axes of dispersers 1 intersected at the intersection point of the inner vault of lower furnace 2 and the central axis of shaft 3. In the two latter cases, the gas phase containing the flying dust was conducted out 4 at the upper part of the reaction zone or in the middle of its vault. Owing to a considerable change in the system, the trials are not fully comparable with each other. In a system without a rising shaft the nozzle velocities of disperser 1 also had to be changed, in which case the shape of the suspension spray was also changed to some extent. The sedimentation experiments were carried out with concentrates with a particle size of 90%/−400 mesh (surface area 12,000 cm²/cm³). Some experiments were carried out with generally used conentrates with a particle size between values 10% − 400 mesh and 100%/−65 mesh (surface area 2500 cm²/cm³).

The following symbols are used in examination of the sedimentation:
— Sedimentation rate:g/s.m²
— Total lower furnace sedimentation rate:La-Σ, g/s.m²
— Sedimentation rate in the zone under the reaction shaft: La-RK, g/s.m²
— Sedimentation rate of the other zones of the lower surface (or case A: zones II + III, case C: zone II, and cases B and D: zones II+ III + IV): La-Se, g/s.m²
— Flowing velocity of the suspension: $\dot{v}_i$, m/s, i = 1,2,3
— Flowing velocity of the suspension in the nozzle of the concentrate disperser: $\dot{v}_p$ m/s
— Suspension density in the reaction shaft after sulfide burning is $d_1$ and after the sedimentation, La-RK, $d_2$: density: $d$, kg/Nm³

Figure 5:
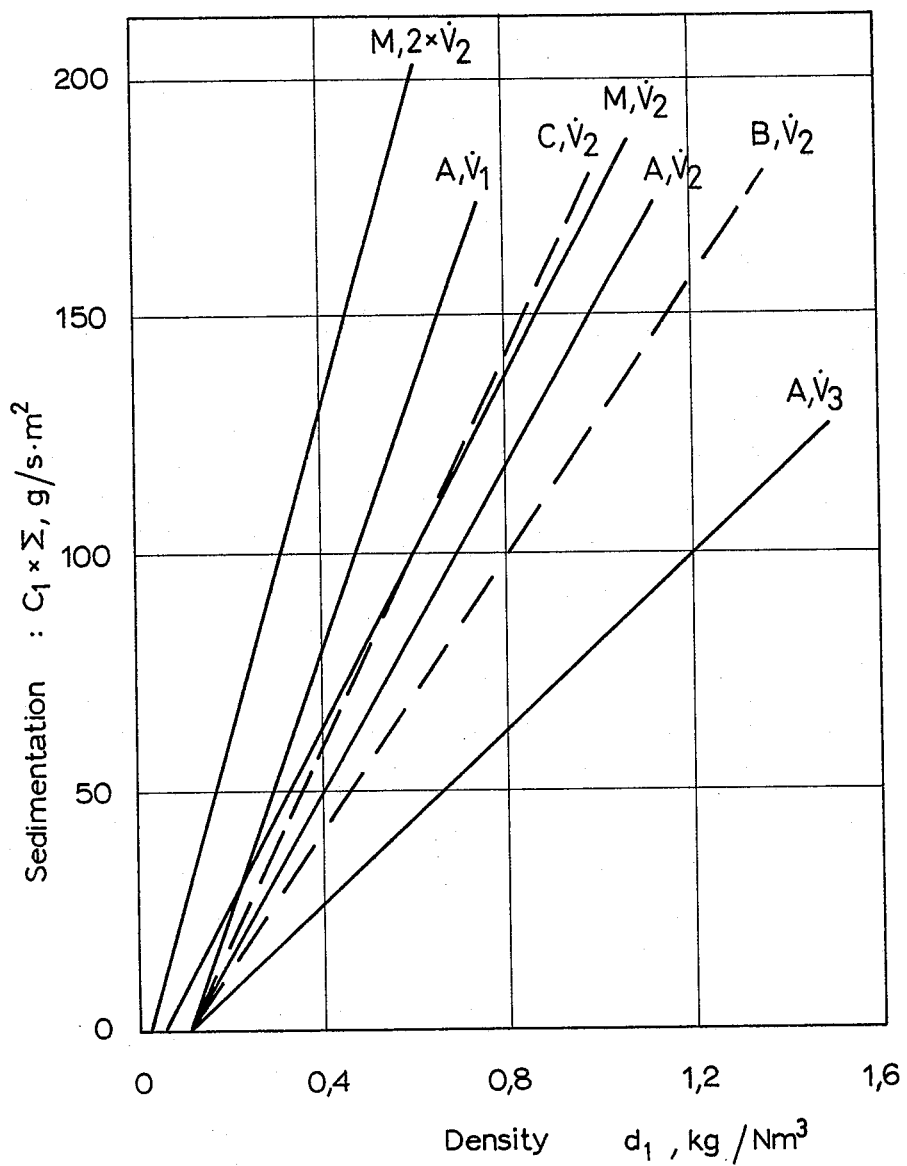
FIGS. 5-7 show graphically the results of sedimentation measurements, FIG. 5 showing the total sedimentation (La-Σ) as a function of the suspension density ($d_1$) in the lower furnace, FIG. 6 showing the sediment falling in the zone under the reaction shaft (La-RK) as a function of the suspension density ($d_1$), and FIG. 7 showing the sediment falling in the other zones of the lower furnace (La-Se) as a function of the suspension density ($d_2$)
Figure 6:
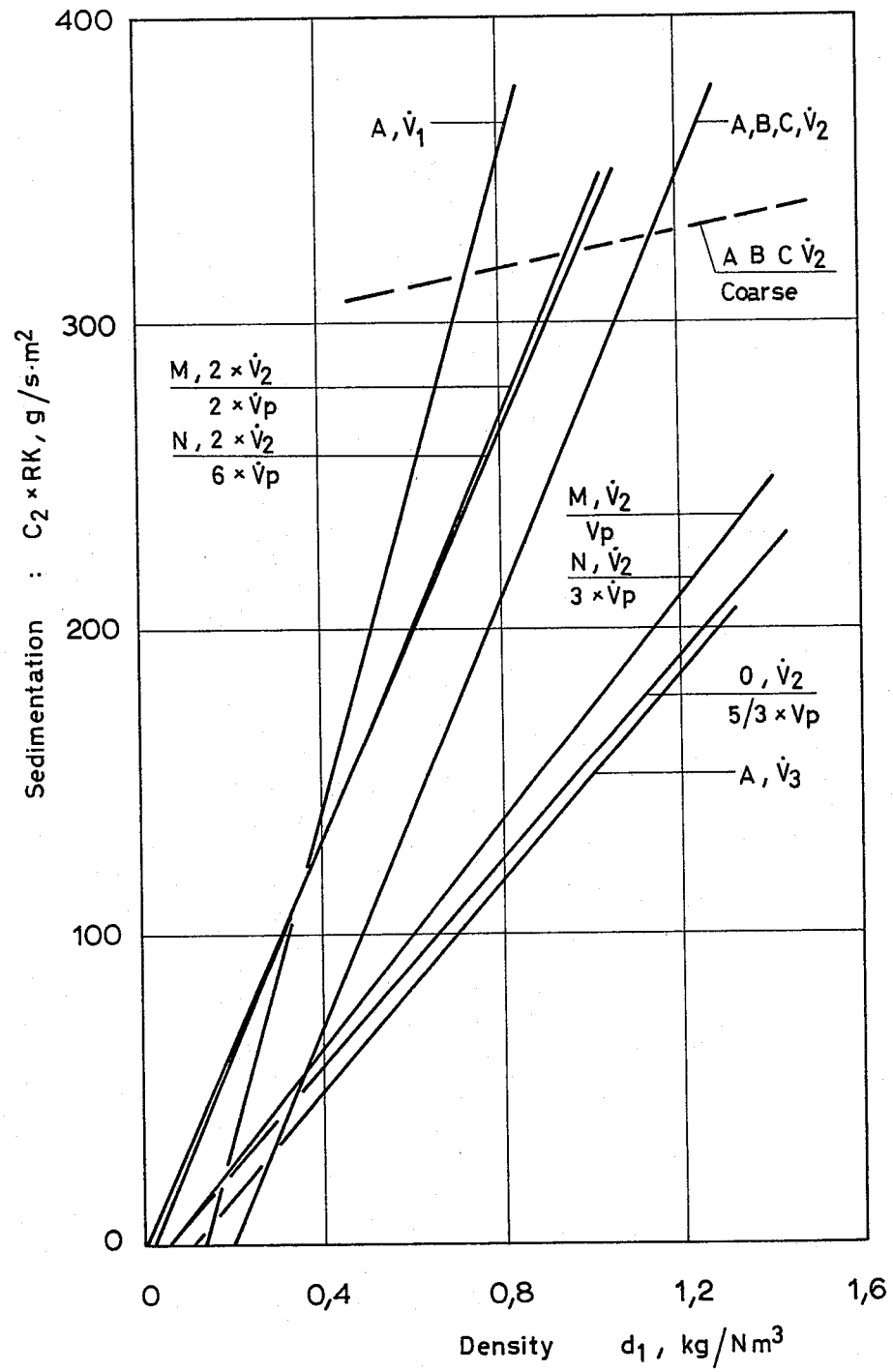
Figure 7:
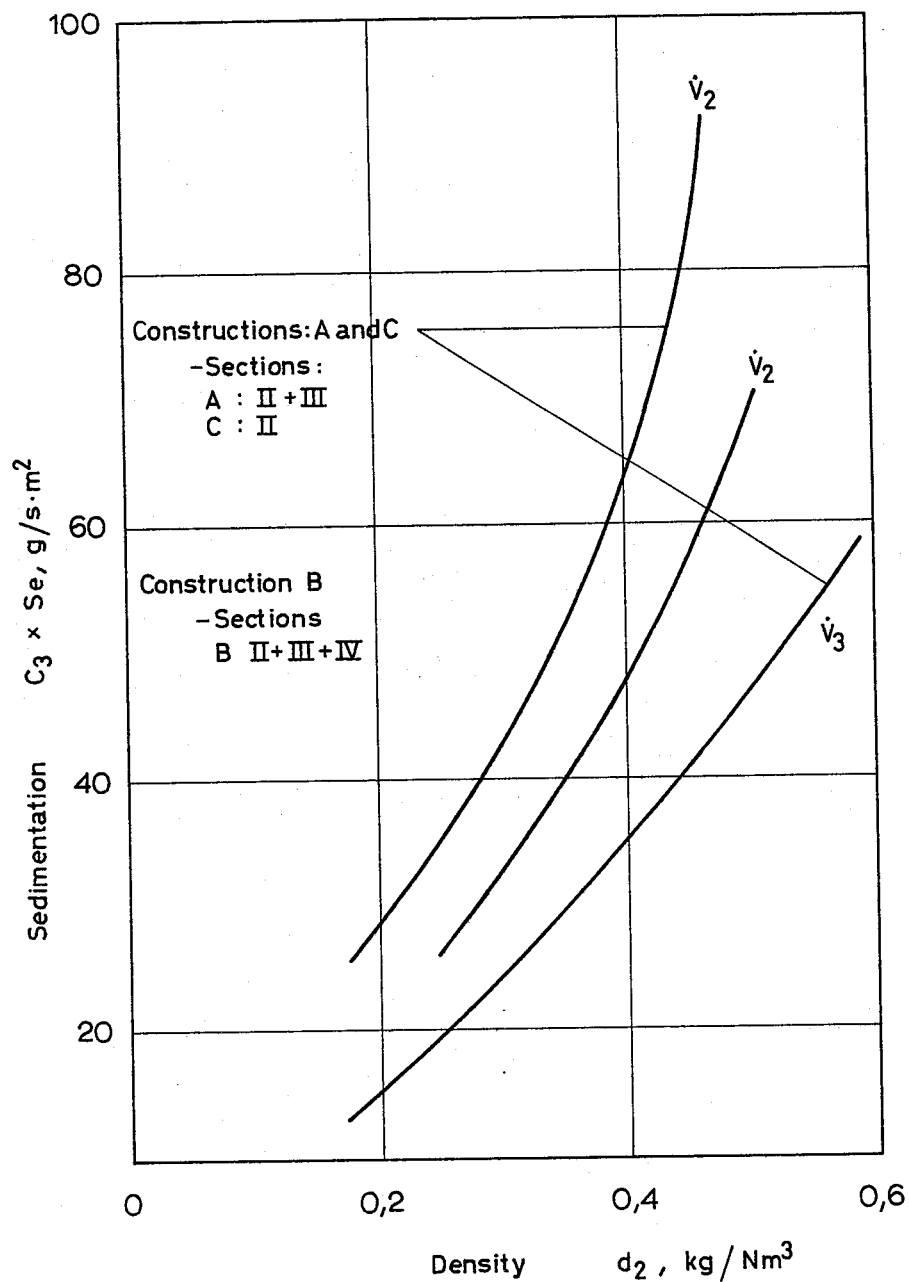

Results of the suspension rate measurements under the circumstances described above are shown in FIGS. 5–7. According to FIG. 5, the total sedimentation rate, La-Σ, is a linear function of the lower furnace suspension density, $d_1$, in the cases studied. The function is of the form $La - \Sigma = q_1(d_1 - d_1)$, in which coefficient $q_1$ is primarily a function of the lower furnace area and the flowing velocity of the suspension. FIG. 6 illustrate the sedimentation rate, La − RK, in zone I below the reaction shaft. According to the FIG. it is also a linear function of the suspension density, of the form $La - RK = q_2(d_1 - d_1)$, in which coefficient $q_2$ is, deviating from the previous one, primarily a function of the flowing velocity of the suspension and therefore independent of the goemetry of the structures follow the reaction shaft under the conditions used.

Owing to the above results, the dependence of the density of the suspension, $d_2$, after the sedimentation, La-RK, on the post-burning suspension density, $d_1$, is linear. The function is of the form $d_2 = q_3(d_1 \pm di)$, in which coefficient $q_3$ is a function of the flowing velocity of the suspension, $\hat{v}_1$.

Regarding the above observation it must be noted that the obtained sedimentation and density functions are functions of different degrees of the granule size distribution of the suspension, especially with different velocity values. Among other things this can be seen in that the density functions do not run through value zero-zero — value di in the differences which proves among other things that with different velocities and determined by the velocities, the suspensions contain different amounts of finely-grained granule classes of different size which cannot sediment at all under the conditions used.

The influence of the different flowing velocity values of the suspension (here $\hat{v}_1 > \hat{v}_2 > \hat{v}_3$) on both the sedimentation rate and the $d_1/d_2$ density distribution values is clear without saying. Reducing into half the cross section area corresponding to the lower furnace gas space (that is, doubling the suspension velocity, $\hat{v}_{22}$, to $2 \times \hat{v}_{22}$ in the lower furnace) does not considerably affect the La- rates but it does considerably lower (thus, contrary to the increase in the total flowing velocity) the La-RK rates, as shown by FIG. 6 and the increasing change in the $d_2/d_1$ distribution.

According to the figure, the shaft product settling in the zones following zone I, La-Se, is no longer a linear function of suspension density $d_2$ — or density $d_1$. When the total sedimentation rate of lower furnace zones I and II is examined as a function of the density, $d_1$, the result is still approximately analogous to that indicated in FIG. 4, but when the number of zones is increased, the final result will be circumstances corresponding to FIG. 5. After the first zone, the lowering of the density of each suspension as a function of the increase in the area (here also the distance) is initially almost linear, but later deviating when the change in density slows down. The lowerings of the suspension density when using different furnace structures (A, B, C) have different gradients — the steepest with structure C and the least steep with structure B — the gradient difference decreasing with decreasing initial density of the suspension. Thus, it can be noted from the obtained results that, when the lower furnace area following the first zone decreases, a certain surface area value is approached after which decreasing the area no longer increases the sedimentation rate per area. In this case the sedimentation rate is a function of only the suspension density, its granule size distribution, and its velocity. With the suspension here used, the limit of the surface area, at which decreasing the area no longer increases the sedimentation rate per area, corresponds to the area of furnace structure A, which can be seen in the graph of FIG. 7, were compared with each other, it was noted that the total sedimentation rates, La-Σ, La-RK, and La-Se, were in the latter only slightly higher than in the former. But the sedimentation rates per zone in zones II and III were about 50% lower and in zone IV about 150% higher with structure D than with structure B. The amounts of flying dust were approximately the same with both furnace structures.

A rise in the limit values of the suspension granule size distribution has a very strong increasing effect on sedimentation rates La-Σ and La-RK — FIG. 6. The lower furnace sedimentation rate also becomes much lower so that the amount of product falling in zone II is great ($\geq$ 80% of product amount La-Se), the other zones containing only little or no sediment. A strong lowering of the flying dust rates occurred when the granule size increased. In the case observed, the determination of the granule size of the sediment samples as a function of the density of the suspension was carried out by measuring the surface area of the samples. The change in surface area as a function of the respective suspension density was of the same form in the cases observed. When the suspension density decreases, only a slight increase occurs in the surface area of the sediment samples of the first two zones. But a strong gas classification occurs in the remaining zones, while the surface areas per zone increase simultaneously. In furnace structure C, the turning point of the surface area function with a high initial suspension density value is situated at a higher density value than that with a low initial value, that is, the efficiency of gas classification increases when the suspension density decreases. In furnace structure B, the above turning point is situated at suspension density values considerably lower than the previous ones. In structure A, the turning point is between the two previous ones.

In the furnaces shown in FIGS. 2, 3, and 4, the behavior of the sedimentation rates, La-Σ and La-RK, as a function of the suspension density is completely analogous to the previous results. The obtained results — FIGS. 5 and 6 — are not, however directly comparable with each other because of the measuring conditions, burning velocity, furnace structure, etc., but they are quite sufficient for technological estimation. It can be noted from the results corresponding to the structure in FIG. 2, in which reaction shaft Rk and rising shaft C are central, that, compared with the previous results, the suspension density, $d_2$, after the sedimentation, La-RK, is a slower increasing linear function of the suspension density, $d_1$, with the same flowing velocity of the suspension, $\hat{v}_1$, and with approximately the same disperser nozzle velocity, $\hat{v}_p$. In this case, the lowering of the flying dust amounts as a function of the density, $d_1$, is not as great as before, either, but on the other hand the flying dust amounts corresponding to the structure of FIG. 2 are, under the used conditions, primarily only half of those obtained with structure B (FIG. 1). The structure of FIG. 3, from which the rising shaft has been eliminated, naturally requires, when the same suspension volume rate — $Nm^3/h$ — is used, higher nozzle velocities than a structure provided with a rising shaft, when aiming at the same flying dust amount. According to the obtained experiences with the used structures according to FIGS. 2 and 3, the nozzle velocities of concentrate dispersers 1, when aiming at equal amounts of flying dust with the same suspension (that is, the same densities and volume flows, and the same (granule) distribution), must be adjusted so that the area of the intersection of the suspension cone and the smelt surface in each is approximately the same. In the trials performed, always using the same type of concentrate disperser, the value obtained experimentally as the ratio of the nozzle velocities was $$v_{p,2}/v_{p,1} - [(A_1 - A_2)/A_2]^p,$$

in which $v_{p,1}$ is the nozzle velocity of the concentrate disperser of a conventional vertical furnace structure, $v_{p,2}$ is the corresponding velocity with a furance structure without a rising shaft (FIG. 3), and $A_1$ and $A_2$ are the areas of the intersections of of the original main reaction zone and the "cut suspension cone" and of the smelt surface and the suspension cone of the same size corresponding to the structure of FIG. 3. Generally examined, the ratios are, however, highly dependable on, among other things, the structure of concentrate disperser 1 and the shape of the obtained suspension cone or parabloid, the quality of the flow phenomena in the main reaction zone (which, for example, in the structure according to FIG. 2 is a function of the dimensions of the inner shaft in comparison with the main shaft, the chemical and physical properties of the suspension produced in the oxidation and/or reduction process, and the smelt phase, etc.).

When proceeding to a structure according to FIG. 4 without a rising shaft, a structure in which the reaction gases and the flying dust are conducted out at the center of the vault of shaft 4 and in which the suspension is produced with the help of three dispersers 1, the above expression can also be used under the same conditions, although reasonably small flying dust amounts can also be obtained with nozzle velocities lower than those calculated by the above expression.

Let it be mentioned that the basic value of the nozzle velocity of the concentrate disperser used in the trails under examination was $\hat{v}_p^o = 35$ m/s.

Basic principles of the suspension process of finely-grained concentrate are stated below.

On the basis of the above examinations and measurements, the following observations can be made concerning the main prerequisites for the processing of finely-grained concentrates:

— As much material as possible must be dissolved from the suspension for the main reaction in the zone under the reaction shaft. This can be achieved, for example, by using a high suspension velocity and a high suspension density in the reaction shaft. The said prerequisites are dependent on the valuable metal content and the other properties of the concentrate in each case. It can, however, be generally noted that among other things an increase in the oxygen content of the combustion air, great amounts of feed - that is, activity in the autogenic area, at which time the use of additional fuel is limited - a suitable circulating load in the system (for example, cooling the shaft with return flying dust, in which case the autogenic area contains greater amounts of feed), a high shaft temperature, and the correct dimensioning of the shaft provide means for meeting the said requirements.

— The furnace sedimentation which causes slag problems must be minimized by decreasing the sedimentation area and thereby the delay and by allowing, when necessary, a moderate increase — in comparison with the use of rough concentrate — in the amount of flying dust (the total flying dust amount can be diminished by pelleting or agglomerating the return dust. The cross section area of the lower furnace gas space must be optimized to correspond to the highest allowed lower furnace sedimentation rate — a function of, among other things, classification of the product of burning.

— The diameter of the rising shaft can be regulated so that the suspension velocities are above the critical conveying velocity, in which case the countercurrent sedimentation of material is small and the danger of growth formation is low.

— When using a furnace structure without a rising shaft, special attention must be paid to the determination of the correct reaction shaft diameter and the correct nozzle velocity of the used suspension dispersers for each kind of concentrate.

— The ratio between the flowing velocity of the suspension after the concentrate disperser nozzle and the absolute value of the flowing velocity of the suspension in the reaction shaft varies between the limits 10–100 in different cases.

— When adjusting the suspension space and the structural geometry of the furnace, special care must be taken that the kinetic conditions for the reduction of the magnetite in the shaft product are met while the area of the main reaction shaft decreases. The total reaction velocity can also be accelerated by the suspension reduction and sulfidization processes developed by us, although there are other methods, which are usually less effective.

Owing to the character of the process, it can be carried out in several different ways. Processing plants have, however, been designed for the production of relatively rough concentrates and conventional low-grade sulfide mattes. Therefore, for economic reasons, it is possible to investigate in practice only few methods easily applicable to the system. In the investigation of the process, observations, partial studies, product sedimentation rate measurements indicated in the examples, and intermediary smeltings were undertaken with several installations — and naturally, within a very long period of time.

Figure 8:
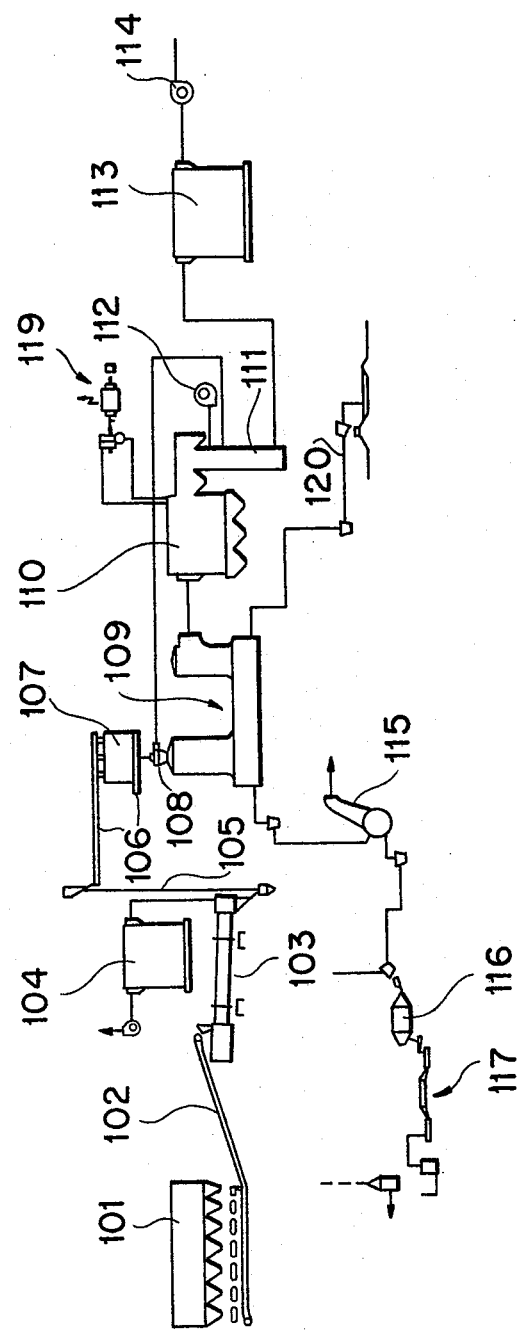
FIG. 8 shows the general outline of the smelting installation used in the experiments.

The general outline of the smelting system used in the investigations is shown in FIG. 8. The system has been assembled from conventional, previously known apparatuses. They are the following:

101. Concentrate storage
102. Belt conveyor
103. Dryer
104. Electric filter of the dryer
105. Pneumatic conveyor
106. Redler conveyor
107. Feed tank
108. Concentrate burner
109. Flash furnace
110. Waste heat boiler
111. Heat exchanger
112. Air blower
113. Electric filter
114. Gas blowers
115. Converter
116. Gora furnace
117. Casting of anodes
118. Casting of slag
119. Turbogenerator
120. Means for withdrawing slag metal and matte from 109.

Figure 10:
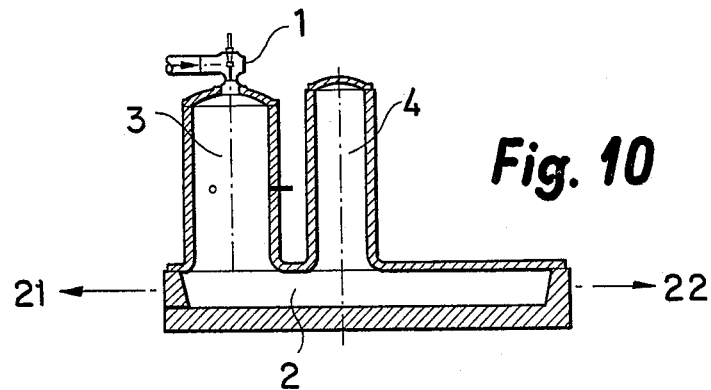
FIG. 10 shows a section along line C—C of FIG. 9.

The outlet 21 for matte and the outlet 22 for slag are indicated at the ends of the furnace in FIG. 10. When using oxygen-rich air, technical oxygen was added into the air before pre-heating apparatuses III were preheated. In the pilot-scale experiments, no heat exchanger was used as a continuation of the radiation part of the vessel to heat the primary air for the smelting, but it was replaced by the normal convection part of the vessel. Neither was the obtained sulfide matte treated further according to the outline in the experiments described. The structural changes in the apparatus for the application of the process according to the invention were carried out in furnace part 9.

A 55 kW intermediate-frequency furnace was used in the intermediary product and other trial smeltings. Heat transmission in the examples in question was obtained by indirect — graphite muffel — heating. The feeding and control apparatuses of the furnaces were conventional. The suspension was usually produced with one concentrate burner. The pre-heating degree of the air used for burning the concentrate was 430° ± 20° C.

The matte, slag, and gas phase samples were studied by conventional methods. The shaft product samples corresponding to the examples were taken just above the smelt surface — in the direction of the center line of the shaft — with an efficiently cooled multisection sample taking device. The feeding, smelting, and matte-slag separation were carried out as precisely as possible in the manner they take place in an actual furnace unit — that is, the re-smelting effects were minimized. The analyses of the samples and products were made by conventional methods. The determination of ferric iron in the shaft product and the slag phase was made from the oxide phase from which the sulfides had been separated by the bromine-methanol separation process.

Figure 9:
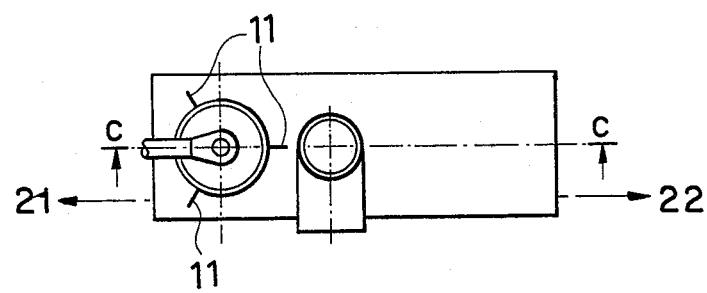
FIG. 9 shows a top view of a suspension smelting furnace according to the invention as set forth in FIG. 1.

Products of processing obtained from a conventional furnace structure by shortening the sedimentation area:

A conventional furnace structure and a vertical furnace structure provided with a shortened lower furnace secondary reaction zone according to the invention is illustrated in FIGS. 9 and 10. In the drawings the elements are referred to by numerals and, number 1 refers to the concentrate burner, 3 to the reaction shaft, 2 to the lower furnace, 4 to the rising shaft. The height of reaction shaft 3 of the vertical smelting furnace was 9.4 m, its diameter 3.8 m, and the cross section area of the shaft 11.64 m$^2$. The height of rising shaft 4 was 9.0 m and its diameter 2.75 m. The total area of the lower shaft 3 was 85.6 m$^2$. In FIG. 1, $a$ refers to the main reaction zone disposed under the suspension reaction zone, while $c$ relates to the smelt settling zone communicating at least with the smelt with the main and secondary reaction zones.

EXAMPLES

In Examples I-VI, the objective was to use during the trials the same concentrate mixture. It was prepared by mixing concentrates from different mines at a predetermined ratio — if slight deviations occurred, the result was reduced in the examples for the sake of comparison. The average analysis — % by weight — was the following: 20.68 Cu; 33.60 Fe; 0.24 Ni; 0.29 Co; 2.43 Zn; 0.29 Pb; 33.96 S; 4.67 SiO$_2$; 0.34 CaO; 1.05 MgO; and 0.20 Al$_2$O$_3$.

The analysis of the sand added to the feed mixture was the following: 0.53 Fe; 89.21 SiO$_2$; 0.27 CaO; 0.35 MgO; and 3.60 Al$_2$O$_3$.

Finely-grained concentrate was made from rough concentrate by additional grinding. The composition of the return dust in the feed mixture varied greatly. Especially its oxygen analysis was very inexact numerically. Efforts were made to prevent sulfatizing of flying dusts by precise control of the amounts of leaking air and, when necessary, by a mild reducing burning.

The analyses of the heavy oil and petroleum ether used for fuel were the following — % by weight:

Heavy oil: 85.0 C; 11.8 H; 2.5 S; and 0.1 H$_2$O
Petroleum ether: 83.5 and 16.5 H
The general objective was to use, ether conditions allowing, as high feeding rates as possible in order that the effects of the dust sedimentation and the flying dust be easy to measure. Before the measurements, the furnace installation was always operated until it was in a stationary state, which took about 50-60 hours, depending on the conditions. Balances were drafted of the thermal balance of the installation, especially in regard to reaction shaft 2 (water cooling) as in FIG. 9. The surface temperature of the slag layer in lower furnace 3 as in FIG. 9 was kept at 1300° ± 30° C. The temperature of the matte was respectively 1200°-1260° C, depending on the shaft temperature.

In Examples VII-X, refinement of finely-grained — 85%/−400 mesh — oxidic copper and nickel ores was carried out by the suspension smelting process. The used nickel ore was a typical laterite ore containing nickel and chrome, its analysis being the following - % by weight: 2.27 Ni; 0.13 Cu; 26.80 Fe; 0.16 Co; 0.80 S; 21.40 SiO$_2$; 0.03 CaO; 12.27 MgO; and 1.70 Al$_2$O$_3$. The copper ore was high-grade malachite (about 30% Cu-CO$_3$.Cu(OH)$_2$), its analysis being the following — % by weight:

18.01 Cu; 18.70 Fe; 1.01 Zn; 30.36 SiO$_2$; 0.65 CaO; 5.25 MgO; and 4.12 Al$_2$O$_3$.

A suspension was produced from each ground ore in the conventional manner, and the suspension was heated to the reaction temperature with oil and air. The oxygen content of the used combustion air was 35% by volume. The sulfidization of the gas phase of the shaft product and the suspension, necessary for high-grade matte and the reduction reactions, was carried out with the help of elemental sulfur and petroleum ether using zone reduction. The sulfidization reactions were very rapid owing to the small granule size of the ground ore. Because of the high density values of the suspension the zone limits (three zones) were sharp and, thus, the zone volumes small, and therefore the consumption of additional sulfur for the sulfidization of the gas phase was very low.

The reduction of the magnetite of the shaft product in the reaction zone of lower furnace 3 as in FIG. 9 was controlled by regulating the feeding rates so that the apparent reduction velocities corresponding to normal production were obtained, in other words, there was enough time for the magnetite reduction to take place to a certain degree. The feed mixture and product rates of the experimental operations and the intermediary smeltings and their analyses, as well as the results of the most important observations, are given in Tables 1 and 2 and in FIGS. 14, 15, 16 and 17. Example I This example represents a normal result of production obtained with rough concentrate under advantageous conditions. The Example has been obtained by using the conventional furnace structure of FIG. 9.

According to Table 2, the results of the shaft sample smelting and production were almost the same. The lower furnace sedimentation rate was low, or about 6.5% of the shaft product (or 4.64 g/s.m$^2$ — the observation area being 58 m$^2$). Judging from the smelting rates of the shaft product, 95% of the copper of the sediment had time to settle into the matte phase of the lower furnace through the slag layer because of its great drop and granule size — thus, the low copper content of the final slag could be expected. Calculated from the as delay period, the apparent reaction velocity values of the magnetite reduction are $0.71 - 0.73 \times 10^{-3}$, $c^{-2}s^{-1}$ ($c=$ concentration; $s =$ second), which is in accordance with previous experiences when examined per surface unit of the reaction shaft.

EXAMPLE II

In this example, an experimental operation corresponding to that in the previous example was carried out using very finely-grained concentrate.

According to the results, the sedimentation and flying dust rates in the lower furnace have grown considerably, or to 13.2 and 16.0% of the feed mixture. The proportion of sediment in the shaft product is thus about 14.8% or 18.0 g/s.m².

When comparing the intermediary smeltings with the final result, a strong influence of sedimentation on the final slag (1.8% Cu) can be noted. On the basis of the results, only about 80% of the copper of the sediment has reached the matte. At the same time, an analysis of the sediment sample proves that its degree of oxidation is higher than that of the actual shaft product. Consequently, the magnetite content of the slag phase has increased, although obviously part of the magnetite phase of the sediment has been reduced under the influence of sulfide matte. The velocity constant obtained for the lower furnace magnetite reduction is $K = 0.71 \times 10^{-3}c^{-2}s^{-1}$, which is only about 4% lower than the respective normal value in a reaction system.

EXAMPLE III

This example deviates from those above in that the flying dusts emerging from the system have not been fed back into the system together with the feed mixture. According to the result table, the results do not deviate from those of the previous experimental operation except in regard to the sedimentation and flying dust rates, which are smaller than in the previous ones. The sedimentation rate in the lower furnace was 9.9% of the feed mixture (or about 11.4% of the shaft product, which corresponds to a lower furnace dust load of 7.49 g/s.m²). The lowered dust rates are a consequence of the fact that finely-grained return dust is not contained in the feed — partly it is also a consequence of the lowered Zn and Pb amounts in the feed mixture. Because the granule size of the lower furnace sediment was larger and its amount smaller than previously, the obtained lower copper content in the slag was to be expected. Over 80% of the copper content of the sediment settled into the matte phase.

EXAMPLE IV

This example deviates from the previous ones in that the gases and flying dusts are removed from the system by decreasing the area of the secondary reaction zone following the zone under reaction shaft 2 from 58 m² to about 20 m², in which case the area obtained for the settling zone following rising shaft 4 as in FIG. 9 is 38 m².

When comparing this example with Example II, it can be noted from the result table that the lower furnace sedimentation rate has decreased considerably, from 13.2% to 4.2%. The obtained sedimentation rate corresponds to about 4.7% of the shaft product, or a dust load of 14.61 g/s.m². The flying dust rate has risen from 16.0% to 18.4% of the feed mixture, which can be considered a relatively small rise.

Owing to the low sedimentation rate, the copper content of the slag has lowered considerably — 0.51% — in comparison with Example II — 1.78% Cu. The ferric iron content in the shaft product falling directly under reaction shaft 3 as in FIG. 9 is almost the same in each case, but the magnetite content in the slag has decreased from 15.9%, which is the value in Example II, to 10.4%.

Judging from the obtained results, over 90% of the copper contained in the sediment has settled into the matte phase. This amount is higher than was supposed for the reason that only the roughest and at the same time fastest sedimenting part of the residual suspension has had time to fall in the lower furnace. The value obtained for the magnetite reduction velocity constant corresponding to the gas delay is $K = 0.75 \times 10^{-3}c^{-2}s^{-1}$, which is corresponding to those ordinarily obtained.

EXAMPLE V

In the experimental operation according to this example, high-grade copper matte was produced by using finely-grained concentrate and a conventional furnace system (FIG. 20). In order to eliminate reaction shaft wall reaction in this and the following case, deviating from the previous ones, a less homogeneous suspension was used in concentrate burning and a content of 1% free oxygen was allowed in the combustion gases. It can be noted from the results in Table 2 that, in comparison with the production of low-grade matte, the sulfur content of the shaft product has decreased considerably. In this case, the overoxidation of the most finely-grained part of the concentrate mixture forming sediment and dusts is natural. Because there was a considerable amount of lower furnace sediment with the used feed mixture and operation method (or about 14% of the shaft product, which corresponds to a dust load of 12.4 g/s.m²), the increase in the copper and ferric iron contents in the final slag phase could be expected. When examining the obtained results, it can be noted that only about 60% of the copper of the sediment has ended up in the final matte. About 65% of the copper content in the slag phase is in a metallic form, which also indicates a strong participation of copper sulfide in the magnetite reduction after the amount of sulfidic iron has decreased sufficiently. Let it be mentioned that even less advantageous slag values than this have been obtained in similar experimental operations, in which cases the copper content has been 4–5%, magnetite content 18–30%, and sulfur content less than 0.1% — let it be noted that in spite of the great variation in the oxidation circumstances, no oxides or ferrites of copper in solid state have been observed in the slags.

The obtained gas delay period value for the apparent reaction velocity constant of the lower furnace magnetite reduction is $K = 1.17 \times 10^{-3}c^{-2}s^{-1}$, which is slightly higher than normal.

EXAMPLE VI

This example deviates from the previous one in that the reaction gases and dusts were removed from the system in a manner corresponding to that in Example IV. In addition, in this case the reduction of the shaft suspension in zones was carried out by using three petroleum ether nozzles 11 as in FIG. 9 (fitted below the middle of reaction shaft 3 (FIG. 9) symmetrically and at the same height) in order to increase the low amount of sulfide after the burning of the shaft product and to increase its activity.

In comparison with the previous examples, the shaft product in the present case is almost of the same grade, and only slightly richer matte than previously is obtained when it is smelted. It is practically impossible to obtain a representative shaft sample after the zone reduction. Thus, the average analysis obtained from the sediment samples of lower furnace 3 of FIG. 9 is quite inexact Table 2. A theoretical shaft product corresponding to the final products has been calculated from the final products and the said analysis. In comparison with Example V — 14% ~ 12.4 g/s.m² — the furnace sedimentation rate is low - 4%, which corresponds to a surface load of 10.6 g/s.m². Respectively, according to the balance values the flying dust rate has grown only 20%; the low value is also partially caused by the unhomogeneous suspension. The low magnetite and copper contents in slag according to Table 2 are, however, possible with the used technology only when using a post-burning suspension reduction.

Before the petroleum ether reduction, the rate of gas emerging from the reaction shaft was about 21, 030 Nm³/h and its dry analysis — % by volume — was the following: 14.3 $SO_2$; 1.0 $O_2$; 0.2 $CO_2$; 84.5 $N_2$. Petroleum ether was fed into each of the three shaft zones at the rate of 50 kg/h. The following gas analysis values — % by volume — were obtained from the mean of gas samples centrally crossing the zone of the lower part of reaction shaft 3 as in FIG. 9 (the values being inexact because there was still a rather great $P_{O_2}$ gradient in the direction of the diameter): 1.7 $H_2$; 3.8 CO; 7.4 $CO_2$; 4.6 $SO_2$; 82.5 $N_2$. The oxygen pressure obtained from ratio $CO_2$/CO was $P_{O_2} = 10^{-8}$ atm. Zone determination at the same point gave a zone area which was approximately 10% of the cross section area of the shaft. The total gas rate calculated from the above values is 21, 410 Nm³/h. Calculating from the gas delay periods, apparent values $K = 1.17 - 1.18 \times 10^{-3} c^{-2} s^{-1}$ are obtained for the magnetite reduction velocity constant, the values corresponding to normal values.

An examination of the heat balance of reaction shaft 3 as in FIG. 9 shows that petroleum ether reduction did not cause a notable change in the mean temperatures of the reaction products.

EXAMPLES VII–VIII

In the experimental operations according to these examples, the heating, reduction, and sulfidizing of oxides in suspension were carried out so that the products obtained were a high-grade sulfide matte and a slag poor in valuable metals. The examples deviate from each other in regard to the sedimentation zone areas of lower furnace 2 as in FIG. 9 so that Example VII represents a conventional furnace system and Example VIII a system in which the settling area after the main reaction zone is about 20 m². The suspension process was the same in both cases. Oxide ore was heated while slightly reducing it so that the suspension temperature before zone sulfidization was 1450° C and the oxygen pressure of the respective gas phase was $P_{O_2} = 10^{-7}$ atm. The volume of the suspension was then 6390 NM³/h. The volume of the three sulfidization zones was 12.5% of the suspension volume. After sulfidization and additional reduction, the zone volume was 960 Nm³/h, the final temperature and oxygen pressure of the suspension T = 1400° C and $P_{O_2} = 1.0 \times 10^{-8}$ atm. After shaft product sulfidization the composition of the gas phase — % by dry volume — was the following: 4.4 $H_2$; 0.7 $H_2S$; 11.7 CO; 22.4 $CO_2$; 0.1 COS; 3.7 $SO_2$; 57.1 $N_2$. According to Table 1, the decrease in the area of the secondary smelt reaction zone had an effect analogous to the results of the previous experiments, in other words, the proportional amount of sediment decreased greatly, but its rate per area remained almost unchanged. From material balances — Table 2 — it can be noted that the lowering of the sedimentation rates had an advantageous effect on the nickel and copper contents in the slag. In slags obtained from processing copper concentrate, the said effect is greater than the one obtained here. According to observations, this is mainly due to the difference between nickel- and copper-containing sulfides in regard to for example, surface qualities. It must be noted in general that the separation of nickel-containing sulfides from the slag phase and their settling through the slag phase is faster than that of copper-containing sulfides. Because usually the nickel present in slags is bound to the oxide and silicate phases, the nickel content in the slag is mainly determined by its degree of oxidation. In the case discussed, the nickel content in slag is small and corresponds well to the $Fe^{+3}/Fe^{+2}$ ratio in the slag — the apparently small ferric iron content corresponds to the low total iron content in the slag.

EXAMPLES IX AND X

The experimental operations according to these examples were carried out with malachite ore, but in other respects they are completely analogous to Examples VII and VIII.

The temperature of the heating and pre-reduction phase of the shaft process was 1450° C, and the oxygen pressure of the gas phase (11,940 Nm³/h) was $P_{O_2} = 10^{-4}$ atm. Owing to the high copper content in the ore, the need of zone reduction was greater than in the previous examples, or about 36% of the gas phase. After sulfidization and reduction, the volume of the zone was 5480 Nm³/h, its temperature 1400° C, its oxygen pressure corresponding to value $P_{O_2} = 1.1 \times 10^{-8}$, and the analysis of the gas phase the following — % by volume: 4.8 $H_2$; 0.5 $H_2S$; 13.1 CO; 26.4 $CO_2$; 0.1 COS; 2.9 $SO_2$; 52.2 $N_2$. According to Tables 1 and 2, the lower furnace sedimentation rates and their effects on the final products correspond to those of the previous experiments. Especially notable among the results is the increasing effect of finely-grained sediment on the copper content in the slag when a conventional lower furnace structure is used in a case in which the amount of ferric iron would correspond to a very low copper content in the slag — Example IX. The apparent reaction velocity values of magnetite reduction in the example fall between values $K = 0.73 - 0.75 \times 10^{-c} c^{-2} s^{-1}$. Though the obtained values are low when high-grade matte is produced, they do correspond to observations made during production. Because of the low iron content in the feed mixture the amount of magnetite to be reduced is low and the reduction mechanism thus mainly corresponds to that in the production of low-grade matte.

Central reaction and rising shaft structures.

Smelting installation from which the conventional rising shaft has been eliminated:

In FIG. 11 is shown an extreme case corresponding to the minimization of the secondary reaction zone in the lower furnace and in which the reaction shaft and the rising shaft are concentric. A normal pilot furnace structure has been provided with suspended inner shaft 5 which functions as reaction shaft 3 so that the cross section area of ring-shaped part 4 which functions as the rising shaft is double compared with the respective area in the inner shaft. The height of reaction shaft 3 is 3.6 m, its diameter 1.5 m, and its cross section area 1.74 m². The height of rising shaft 4 is the same as that of reaction shaft 3 and its diameter 1.5 × 0.9 m. The area of lower furnace 2 is the same in all structures (FIGS. 11, 12, and 13), or 7.42 m². The inner shaft has been eliminated from the structure without a rising shaft shown in FIG. 12. In the structures shown in FIGS. 11 and 12, the outlet routes for the exhaust gases and flying dusts are similar — the structure is meant for pilot operations only, because especially when high-grade mattes are produced it is prone to dust growths. Whe using three concentrate dispersers in the structure according to FIG. 13, the outlet for gases and flying dusts has been placed in the middle of the vault of shafts 3 and 4.

EXAMPLES

The concentrate and fuel analyses corresponding to Examples XI–XIV are the same as those in Examples I–VI. Flying dusts were not fed back into the system.

EXAMPLE XI

This example represents the result obtained when smelting very finely-grained concentrate in a conventional pilot furnace system. According to Table 1, the amount of lower furnace sediment is 19.6% of the shaft product, or the dust load is 5.8 g/s.m². The lower furnace sedimentation rates of the previous examples deviate from those according to this example (analogous industrial scale Example III: sedimentation 11.4%, or 7.5 g/s.m²) because of the difference in the lower furnace areas of the industrial- and pilot-scale systems, but the proportional behavior of the sediments is naturally the same. Owing to the small sample amounts obtained, intermediary smeltings were not performed. Estimating from the shaft product, the copper content in slag obtained without the influence of sedimentation is about 0.5% Cu. Under the influence of sedimentation the copper content in slag, however, increases to 2.3% Cu — Table 2. Thus, about 77% of the copper content in the sediment has proceeded into the matte phase. The value obtained for the apparent velocity constant of magnetite reduction is $K = 0.71 \times 10^{-3} c^{-2} s^{-1}$, which is in accordance with previous experience.

EXAMPLE XII

In this example, the central shafts were used so that the first shaft functioned as a reaction shaft which was provided with one concentrate disperser, and the outermost ring-shaped part functioned as a rising shaft (FIG. 11). The suspension velocity after nozzle 1 of the concentrate disperser was in this example the same as in the previous one (40 m/s).

The sedimentation rates in the ring-shaped secondary reaction zone were not measured. The values in Table 2, however, indicate very low copper and ferric iron contents in the slag phase. A very notable result is the small flying dust rate obtained under the used conditions; this amount had decreased from 9.7% in the previous example to 6.5% — calculated from the amount of feed mixture, Table 2. Judging from the shaft product and final product values, the shaft product had spread quite evenly over the reaction zone in spite of the narrower reaction shaft.

EXAMPLES XIII AND XIV

In these examples the rising shaft had been eliminated completely. In a modification according to Example XIII in which a central concentrate disperser was used, the exhaust gases with their dusts were removed at the periphery of vaults 3 and 4. In Example XIV, three concentrate dispersers 1 fitted at the periphery of the vault of reaction shaft 3 2,4 were used and the exhaust gases with their dusts were emitted at the center of the vault (FIG. 13). The suspension velocity after the nozzle of the concentrate disperser was in Example XIII about 2.3-fold (90 m/s) and in Example XIV about 1.8-fold (70 m/s) when compared with the velocity value of the previous examples.

It can be seen from the results of the experimental operations — Tables 1 and 2 — that very small copper and ferric iron contents of slag can be obtained by both methods. The flying dust rate (5%) obtained with the nozzle velocity values used in the trial according to Example XIII corresponds to that in Example XII. Instead, the nozzle velocities of dispersers 1 corresponding to Example XIV are still insufficient for obtaining the flying dust rates corresponding to the previous trial, but the obtained dust rate (10.6%) is sufficiently small considering the process.

Judging from the analysis of the products, no notable change took place in either trial in regard to the reduction reactions, but the apparent reaction velocities were of the conventional degree in spite of the considerable increase in spraying velocity.

Figure 14:
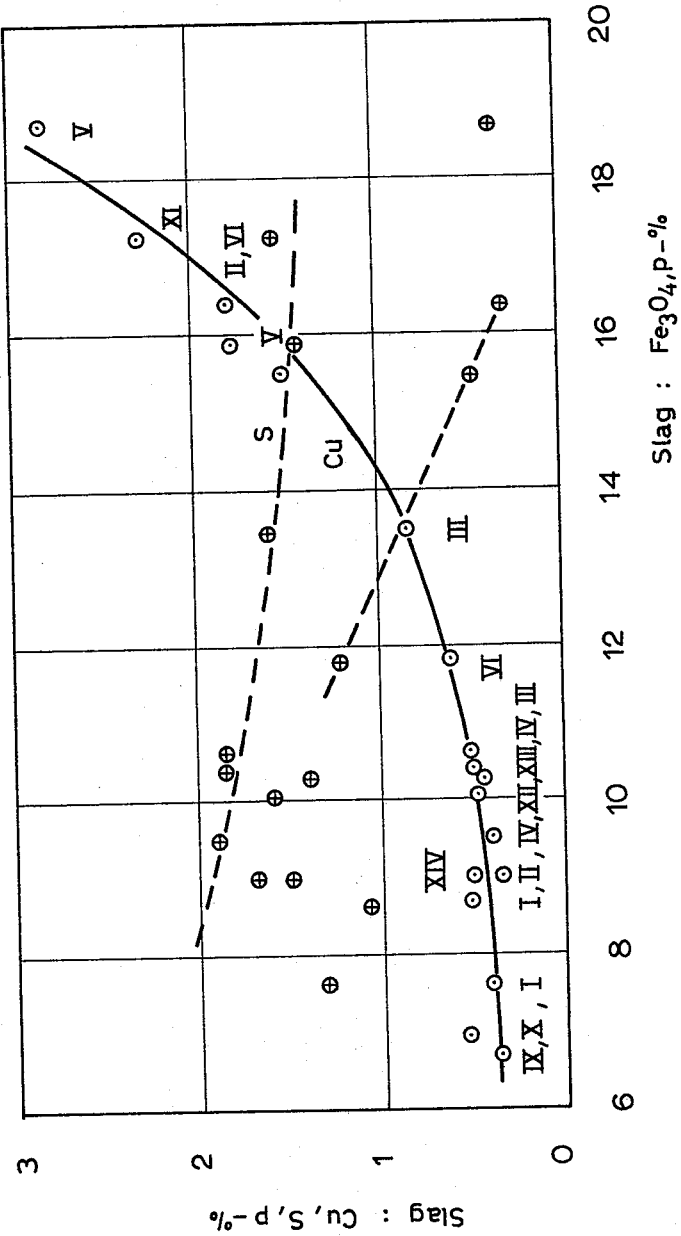
FIG. 14 shows the copper and sulfur contents of the slag as functions of its magnetite content.
Figure 15:
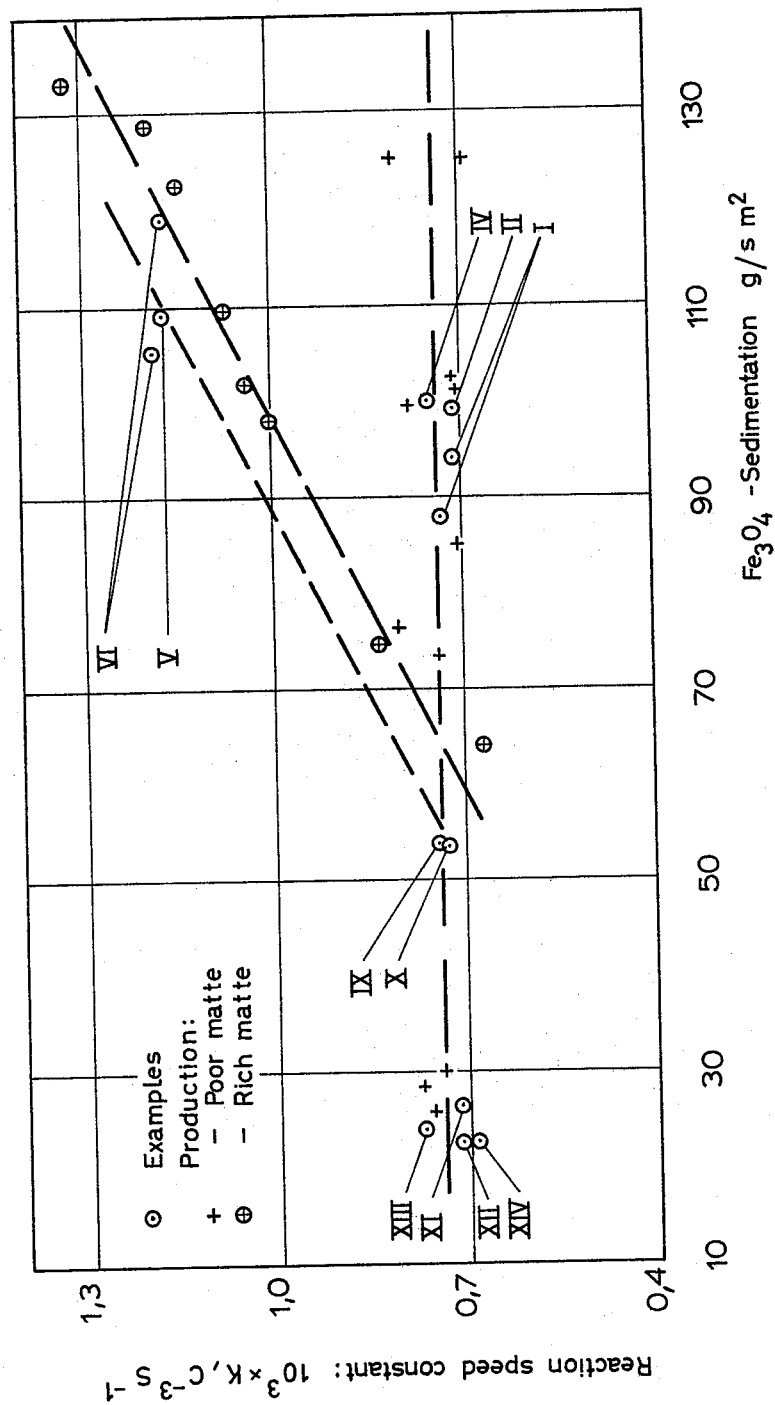
FIG. 15 shows graphically the dependence of the reaction velocity constant on the magnetite amount in the shaft product which is in the process of reduction.

The most important results of the examples as can be seen in FIGS. 14-17. FIG. 14 shows the copper and sulfur contents in slag as a function of its magnetite content. According to the figure, the copper content in slag is a regularly continuing function of its magnetite content. The obtained result is, however, only apparent and characteristic of the used conditions and, thus, not a balance function. In practice the function is influenced by the grade of matte (because of the process, the valuable metal content gradient in the slag-matte system is vertical so that the slag is in balance with a lower-grade matte than that produced on industrial scale), the magnetite reduction velocity, sedimentation rate, suspension burning technology, etc. Often, however, a regular Cu — $Fe^{+2}$ function is obtained which indicates the dynamic balance of the flash smelting system (but there is no dependence between, for example, the valence of the copper in slag - 0, 1, 2 - and the said figure, the sulfur content in slag is not a very regular function of its magnetite content. When producing high-grade matte, however, a dependence between a low sulfur, a high ferric iron, and a high copper content in slag can be observed regularly — $FeS_x$ is used up and $Cu_xS$ begins to participate in the reduction; this dependence can be eliminated by a partial reduction of the shaft suspension. The dependence of the reaction velocity constant as a function of the amount of magnetite in shaft product under the process of reduction indicated in FIG. 10 has been used in the example and in trials in general as one means for observing the reality of the obtained results (in other words, the results of this highly complicated process mechanism are not a consequence of random factors). Thus, observations prove than the reaction mechanism and kinetic prerequisites of the magnetitite reduction of this modification of vertical suspension smelting are controlled, for example, in the experimental operations according to the examples. The used process is not theroretical.

Figure 16:
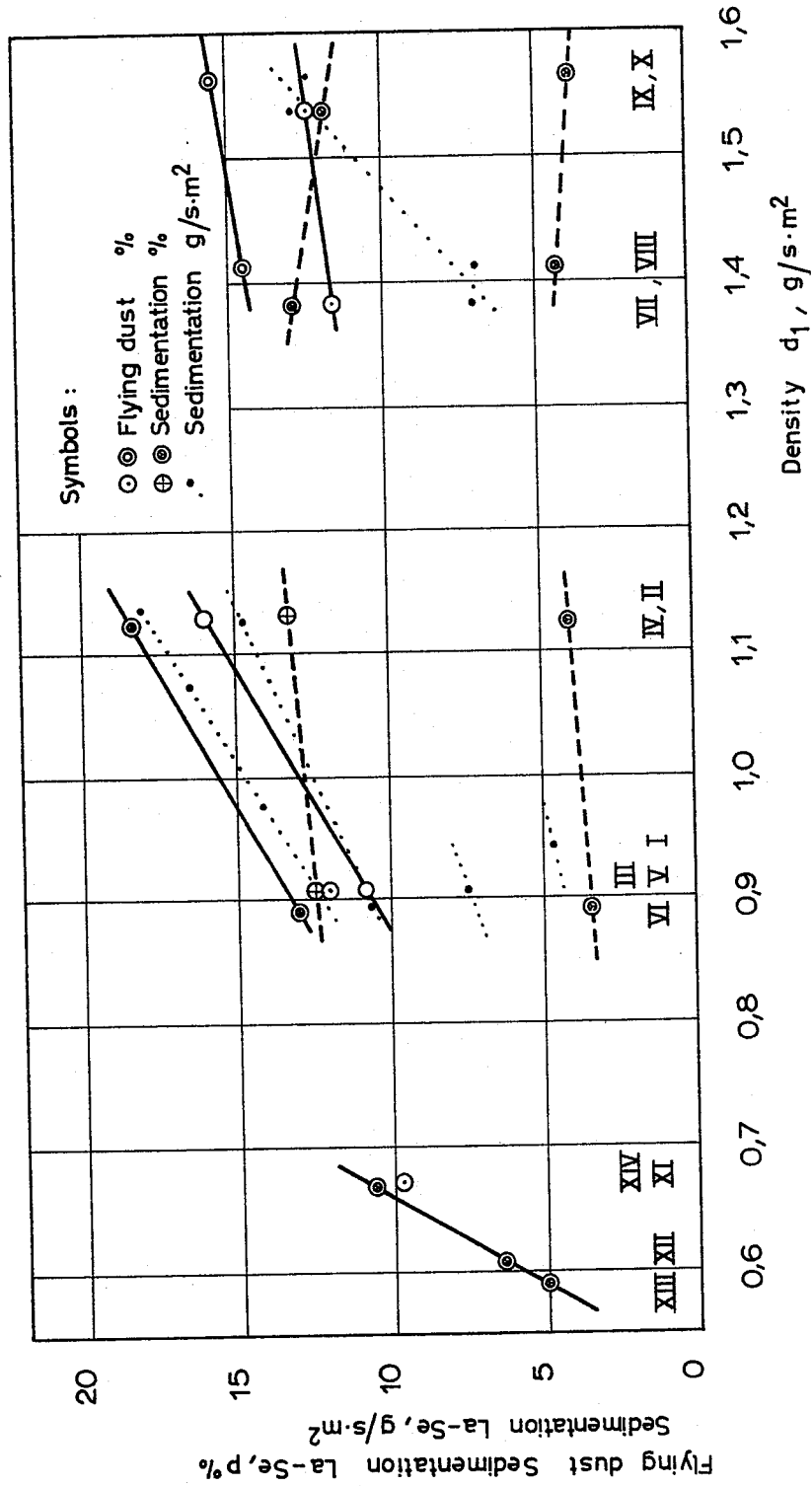
FIG. 16 shows graphically the sedimentation and flying dust rates as functions of the suspension density ($d_1$)

The sedimentation and flying dust rates shown in FIG. 16 indicate very clearly the extent and direction of the behavioral changes in the suspension and their harmony with the previous observations, although the arrangements for the trails were very simple for economical and productional reasons.

Figure 17:
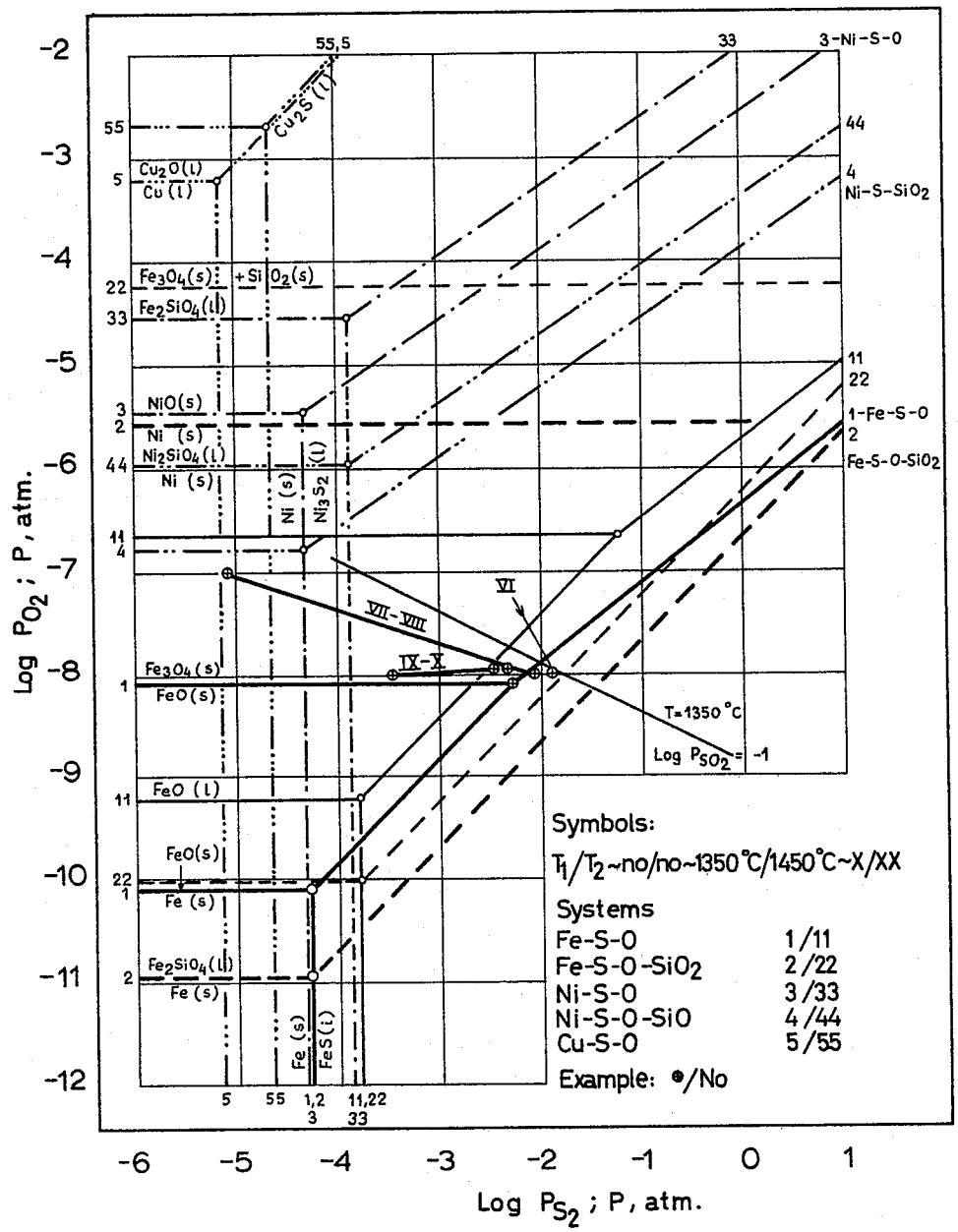
FIG. 17 shows the stability ranges of the (Fe, Ni, Cu) — S—O—$SiO_2$ systems as functions of the sulfur and oxygen materials in the gas phase.
Figure 18:
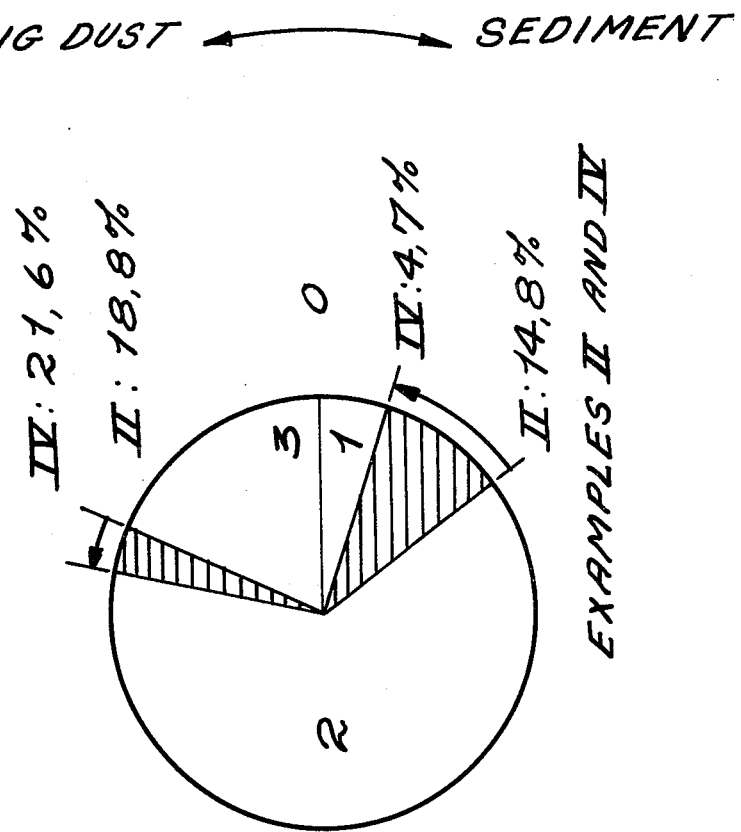
FIGS. 18 and 19 are charts indicating production withrough concentrate.
Figure 19:
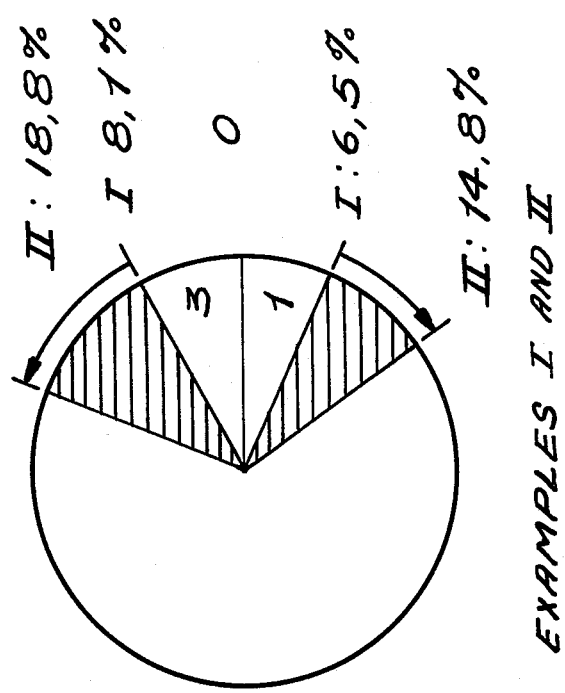

FIG. 17 shows the stability ranges of the metal, sulfide, oxide, and silicate phases which can be considered when using zone reduction and sulfidization as a function of the sulfur and oxygen pressures within the used temperature range; they were calculated in connection with the observations.

According to the graph of phase stability as set forth in FIG. 17, the composition of the gas phase after zone reduction in the production of rich copper matte according to Example VI is within the stability range of molten copper and iron sulfides. The composition of the basic gas phase ($10g\ P_{O_2} = -2.00$ and $10g\ P_{s_2} = -12.75$) is outside the coordinates. The pre-heating and pre-reduction gas phase of nickel-containing laterite — Example VII — is within the stability range of the magnetite and nickel, nickel oxide, and nickel olivine phases, but the gas phase corresponding to zone reduction — Example VIII — is within the range of nickel and iron sulfides, as it should be. The pre-reduction process for the refinement of malachite — Examples IX and X — was carried out until its oxygen pressure was lower than that obtained in laterite reduction, but otherwise the obtained result is analogous to the result of the nickel process.

It can be noted in general that it is easy to produce a suspension of solid material in a gas volume which is at a low temperature and therefore rather small. On the other hand, the dissolution of suspension at a high temperature, at which time its viscosity values are often manifold and the density of the suspended material low, is a very difficult task, especially when the suspended material is very finely-grained. According to observations, the amount of material separated from the suspension in the main smelt reaction zone increases as a function of the suspension density and the suspension velocity (the increase being faster than would be expected on the basis of the change in density). The sedimentation rate of the other zones in the lower furnace also increases as a function of the velocity and the suspension density. This sedimentation, under influence of which the valuable metal and magnetite contents in the slag phase increase, is very harmful to the process, especially when producing high-grade mattes. When the grade of concentrate improves, the overoxidation of finely granule classes, effective classification, the decrease in the sedimentation rates of matte-slag separation, and the decrease in the reaction velocity of reduction increase the harmful effect of the furnace sedimentation leading to unecomonical after-treatment processes of slag when using the conventional vertical process to produce low-grade mattes.

In the present specification, an apparatus has been introduced in which the disadvantageous effects of sedimentation can be decreased decisively by regulating the sedimentation rate (La-Se) in the zones following the reaction shaft. In this case, when using a conventional rising shaft, a greater than usual amount of returnable flying dust must be allowed in the process, or when using a system without a rising shaft, the suspension velocity after the concentrate disperser must be increased. This increase in the suspension velocity shortens the time used for actual sulfide oxidation when a conventionally dimensioned reaction shaft is used. For this reason, depending on the type of concentrate and other factors, the height of the reaction shaft must be increased and simultaneously the area of the main smelt reaction zone (which is a function of the cross section area of the reaction shaft) must be kept high enough to obtain a sufficient delay period for the reduction of the magnetite in the shaft product. On the other hand, this process also makes it possible to use finely-grained concentrates and to carry out the process by using the suspension process. Thus, it makes possible large production units while eliminating the previous difficulties and uneconomical after-treatment of slag.

On the basis of investigations, the flying dust load mentioned above can be reduced considerably by agglomerating or micropelleting the flying dust to be fed back into the process. The composition of the flying dust corresponds approximately to the product of burning in the reaction shaft — any differences can further be evened out by a mild rising shaft reduction so that a shaft process is not necessary. The treated return flying dust can then be fed into the smelt reaction zone either together with the feed mixture, in which case its temperature can be increased simultaneously, or by using some other feeding method depending on the system. By this method, the effect increasing the sedimentation of very finely-grained material and flying dust is eliminated and, when desired, an improved slagging of, for example, zinc and lead is obtained - in Example III, an effect analagous to the method described above is obtained by not feeding flying dusts back into the system.

The effect of the suspension density and velocity on the sedimentation rates is noteworthy. With present-day technology, by increasing the oxygen content in the burning air, sufficiently high and advantageous suspension density values can be easily obtained, but at the same time the suspension velocity values are proportionately lowered within the same system. Decreasing the reaction area in order to increase the suspension velocity is mainly dependent on the valuable metal content of the initial suspension. The reduction velocity of the magnetite of the main smelt reaction zone determines the dimensions of the system very precisely so that often the said process is not practicable at all.

According to experience, the reduction velocity of magnetite increases with improved oxide-sulfide contact so that a decrease in the plasticity of the collision surface has an advantageous effect on the process. Structurally the plasticity of the collision surface can be influenced so that a slanted bottom structure deepening towards the matte-slag separation zone is placed immediately under the smelt surface in the part of the lower furnace containing the main and secondary reaction zones (for example, FIG. 1, structure C, zones I and II). Thus, in an arrangement corresponding to furnace structure C, the viscous flow of material from under the reaction shaft is mixed with the sediment, in which case drop merging and mixing result in a considerable decrease in the effect of the sedimentation. The said method is advantageous especially when producing high-grade matte and metal and when the sediment is overoxidized. An arrangement analogous to the former case in which furnace structure C has been modified so that the reaction shaft and the rising shaft have changed places, is suitable for the production of low-grade matte, in which case the sediment contains a great amount of sulfide phase in relation to the oxide phase (when needed, the amount of sulfide can be increased by an intermediary reduction, thereby ensuring the viscous flow and eliminating the effect of the sedeimentation). In addition to the increase in the reduction velocity and the drop size, the above solutions are advantageous especially when massproducing high-grade mattes in the selective sulfidization of overoxidized valuable metal components (Ni, Co, etc.) of the shaft product in the lower furnace reaction zone (for example, when pentlandite process:

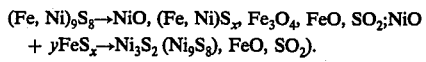

$+ y\text{FeS}_x \rightarrow \text{Ni}_3\text{S}_2 (\text{Ni}_9\text{S}_8), \text{FeO}, \text{SO}_2)$.

Only linear furnaces have been discussed in the description of the process so far. This is mainly due to the fact that changing the shape of the furnace will usually not make the process notably more advantageous because of sediment classification. The use of non-linear furnace structures in production often causes great practical difficulties and wearing phenomena due to growths and "pile formation" of unreacted sediment. The objective in the present examination has also been to carry out the experimental operations and measurements under conditions in which the dissolution of the suspension on the wall surfaces of the reaction shaft has been eliminated. With the "turbulent spray" type concentrate burners developed by us it is possible, when producing high-grade matte and metal in particular — especially when using oxygen-rich combustion air — to burn the concentrate and to conduct the products of burning to the wall of the reaction shaft, in which case the magnetite in the product of burning will be reduced effectively under the influence of the good oxide-sulfide contact, the increased reaction surface, and the lengthened delay period. At the same time the process decreases the furnace sedimentation and flying dust rates. At the present technological level, however, the disadvantages of the method are so obvious (great wear and tear, increased heat losses, etc.) that using it in the conventional process has been avoided (in addition, it must be noted that when using finely-grained concentrates, the obtained decrease in the sedimentation and flying dust rates is not yet sufficient). On a small scale, an experimental model of a semilinear furnace structure has also been tested in which the part of the lower furnace connecting the reaction and rising shafts — that is, the secondary reaction zone — forms part of the circular ring or segment from which the linear matte-slag separation part begins. In this case, an unusually great lower furnace sediment amount obtained when using high lower furnace velocities is conducted to the autogenically lined lower furnace wall, at which time the drop merging and reduction velocities increase and simultaneously the sediment is conducted away without causing slag damage. The method has a disadvantage in that the furnace size is still limited in order to obtain a sufficient sediment separation. On the other hand, the method provides a special advantage — especially when it is combined with reaction shaft wall reactions — when reaction

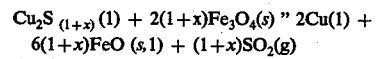

must be induced in connection with the production of copper, especially at a relatively low temperature, because the drop size of the formed metal can then be sufficiently increased and, respectively, a "copper cloud" which is for the most part finely-ground is eliminated from the slags. Note that it is possible to apply either a resistance heating or light arch apparatus -or both — for satisfying the need of heat in the lower furnace matte-slag separation zone when necessary.

Table 1.

| Example Balance component | Quality | I | II | III | IV | V | VI |
|---|---|---|---|---|---|---|---|
| Feed mixture amount | tn/h | 17.0 | 28.5 | 15.7 | 25.0 | 21.0 | 21.8 |
| Oil amount - reaction shaft | kg/tn | 4.04 | 2.01 | — | 7.02 | — | 1.30 |
| Oil amount - furnace | | — | 18.67 | — | 15.69 | 27.56 | 19.50 |
| Benzine amount | kg/tn | — | — | — | — | — | 6.95 |
| Sedimentation amount in lower furnace | | | | | | | |
| from feed mixture | % | 5.07 | 13.2 | 9.9 | 4.2 | 12.2 | 3.5 |
| from shaft product | % | 6.5 | 14.8 | 11.4 | 4.7 | 14.0 | 4.0 |
| dust load | g/s.m$^2$ | 4.64 | 18.0 | 7.49 | 14.6 | 12.3 | 10.6 |
| Flying dust amount | | | | | | | |
| from feed mixture | % | 6.9 | 16.0 | 12.0 | 18.4 | 10.7 | 13.0 |
| Gas amount in reaction shaft | Nm$^3$/h | 15700 | 22400 | 15100 | 19900 | 20420 | 21410 |
| Gas velocity in reaction shaft | m/s | 2.30 | 3.18 | 2.21 | 2.82 | 2.98 | 3.13 |
| Gas delay in reaction shaft | s | 4.09 | 2.96 | 4.26 | 3.33 | 3.15 | 3.00 |
| Total gas amount in the furnace | Nm$^3$/h | — | 28530 | — | 24420 | 27100 | 26310 |
| Gas velocity in lower furnace | m/s | — | 8.15 | — | 7.07 | 7.87 | 7.64 |
| Gas velocity in rising shaft | m/s | — | 7.44 | — | 6.37 | 7.19 | 6.97 |
| Reduction speed constant | 10$^3$/c$^2$.s | 0.71 | 0.71 | — | 0.75 | 1.17 | 1.17 |
| Heat amounts | | | | | | | |
| feed to reaction shaft | Mcal/h | 16770 | 25090 | 16590 | 22880 | 18400 | 20420 |
| shaft product | Mcal/h | 7060 | 12380 | 7170 | 11400 | 6100 | 7060 |
| gas phase | Mcal/h | 8110 | 11210 | 7830 | 9980 | 10600 | 11680 |
| heat losses | Mcal/h | 1600 | 1500 | 1590 | 1500 | 1700 | 1680 |
| Reaction shaft average temp. | °C | 1400 | 1350 | 1400 | 1350 | 1400 | 1400 |

| Example Balance component | Quality | VII | VIII | IX | X |
|---|---|---|---|---|---|
| Feed mixture amount | tn/h | 11.3 | 11.7 | 22.8 | 23.7 |
| Oil amount - reaction shaft | kg/tn | 94.77 | 93.55 | 77.01 | 76.03 |
| Oil amount - furnace | | 108.18 | 108.16 | 13.86 | 18.95 |
| Benzine amount | kg/tn | 3.21 | 3.11 | 13.45 | 12.97 |
| Sulphur amount | kg/tn | 20.01 | 19.34 | 60.34 | 58.20 |
| Sedimentation amount in lower furnace | | | | | |
| from feed mixture | % | 12.9 | 4.3 | 11.8 | 3.9 |
| from shaft product | % | 14.9 | 4.9 | 14.3 | 4.1 |
| dust load | g/s.m$^2$ | 7.02 | 6.99 | 12.94 | 12.44 |
| Flying dust amount | | | | | |
| from feed mixture | % | 11.6 | 14.5 | 12.4 | 15.5 |
| Gas amount in reaction shaft | Nm$^3$/h | 7120 | 7270 | 14120 | 14420 |
| Gas velocity in reaction shaft | m/s | 1.04 | 1.06 | 2.00 | 2.05 |
| Gas delay in reaction shaft | s | 9.02 | 8.84 | 4.69 | 4.60 |
| Total gas amount in the furnace | Nm$^3$/h | 21240 | 21870 | 17770 | 19590 |
| Gas velocity in lower furnace | m/s | 5.72 | 5.93 | 5.08 | 5.60 |
| Gas velocity in rising shaft | m/s | 5.63 | 5.80 | 4.64 | 5.11 |

Table 1.-continued

| | | | | | |
|---|---|---|---|---|---|
| Reduction speed constant | $10^3/s.C^2$ | — | — | 0.73 | 0.74 |
| Heat amounts | | | | | |
| feed to reaction shaft | Mcal/h | 10740 | 10980 | 21710 | 22210 |
| shaft product | Mcal/h | 3560 | 3700 | 9850 | 10180 |
| gas phase | Mcal/h | 5690 | 5800 | 10270 | 10440 |
| heat losses | Mcal/h | 1480 | 1470 | 1590 | 1590 |
| Reaction shaft average temp. | °C | 1400 | 1400 | 1360 | 1360 |

Table 2.

| Balance component | Amount kg/tn, % | Weighted analyses | | | | | | |
|---|---|---|---|---|---|---|---|---|
| | | Cu | Fe | $Fe^{+3}$ | Me | S | O | $SiO_2$ |
| Example I | | | | | | | | |
| Feed mixture | 1000.0 | 18.24 | 29.57 | 1.14 | 4.09 | 28.38 | 1.0 | 14.14 |
| Shaft product | 100.00 | 21.29 | 34.59 | 17.73 | 3.35 | 10.59 | (10.69) | 17.03 |
| Matte-1 | 38.20 | 55.09 | 17.19 | (3.76) | 3.05 | 22.19 | 2.15 | 0.24 |
| Slag-1 | 59.20 | 0.42 | 47.31 | 3.70 | 3.69 | 1.30 | (14.4) | 28.61 |
| Sedimentation | 56.6 | 21.5 | 34.8 | 20.3 | 3.4 | 8.6 | (12) | 17.2 |
| Matte-2 | 303.9 | 55.08 | 17.25 | (3.77) | 3.05 | 22.19 | 2.16 | 0.23 |
| Slag-2 | 472.7 | 0.52 | 47.30 | 4.20 | 3.68 | 1.10 | (14.6) | 28.59 |
| Flying dust | 69.4 | 18.0 | 28.4 | (16.2) | 20.4 | 7.0 | (14) | 8.0 |
| Example II | | | | | | | | |
| Feed mixture | 1000.0 | 18.31 | 29.12 | 2.54 | 5.15 | 26.30 | 1.9 | 14.26 |
| Shaft product | 100.0 | 21.06 | 34.21 | 16.16 | 3.31 | 11.57 | (9.82) | 16.84 |
| Matte-1 | 41.69 | 50.04 | 22.18 | (4.52) | 2.24 | 22.77 | 2.59 | 0.09 |
| Slag-1 | 56.01 | 0.35 | 44.58 | 4.34 | 4.24 | 1.69 | (13.6) | 30.00 |
| Sedimentation | 131.5 | 21.3 | 34.5 | 19.5 | 3.4 | 8.9 | (12) | 17.0 |
| Matte-2 | 295.8 | 49.35 | 22.65 | (4.63) | 2.30 | 22.79 | 2.65 | 0.09 |
| Slag-2 | 411.4 | 1.78 | 44.25 | 7.65 | 4.21 | 1.43 | (14.3) | 29.73 |
| Flying dust | 160.1 | 18.6 | 26.3 | (15.5) | 17.1 | 7.0 | (12) | 12.5 |
| Example III | | | | | | | | |
| Feed Mixture | 1000.0 | 18.25 | 29.66 | 0.1 | 2.87 | 29.97 | 0.0 | 14.60 |
| Shaft product | 100.0 | 21.15 | 34.76 | 16.24 | 2.01 | 11.75 | (9.63) | 17.28 |
| Matte-1 | 41.73 | 50.00 | 22.69 | (4.26) | 1.60 | 23.02 | 2.44 | 0.15 |
| Slag-1 | 56.06 | 0.51 | 45.13 | 5.13 | 2.40 | 1.84 | (13.4) | 30.72 |
| Sedimentation | 98.9 | 21.3 | 35.0 | 18.4 | 2.0 | 10.1 | (11) | 17.4 |
| Matte-2 | 310.9 | 49.83 | 22.82 | (4.28) | 1.61 | 23.04 | 2.46 | 0.15 |
| Slag-2 | 420.1 | 0.85 | 45.13 | 6.51 | 2.40 | 1.60 | (13.8) | 30.72 |
| Flying dust | 120.0 | 20.0 | 30.0 | (18.1) | 11.3 | 7.9 | (12) | 13.7 |
| Example IV | | | | | | | | |
| Feed mixture | 1000.0 | 18.41 | 29.17 | 3.0 | 5.90 | 25.98 | 2.4 | 13.54 |
| Shaft product | 100.0 | 21.10 | 34.29 | 15.94 | 3.32 | 11.86 | (9.68) | 16.88 |
| Matte-1 | 41.84 | 49.90 | 22.05 | (4.04) | 2.34 | 23.13 | 2.32 | 0.09 |
| Slag-1 | 55.92 | 0.40 | 44.82 | 4.58 | 4.19 | 1.90 | (13.6) | 30.11 |
| Sedimentation | 42.1 | 21.2 | 34.4 | 17.2 | 3.3 | 10.9 | (10) | 17.0 |
| Matte-2 | 294.9 | 49.85 | 22.08 | (4.05) | 2.34 | 23.14 | 2.32 | 0.08 |
| Slag-2 | 394.8 | 0.51 | 44.82 | 5.02 | 4.20 | 1.85 | (13.7) | 30.10 |
| Flying dust | 183.7 | 19.1 | 27.0 | (16.2) | 19.4 | 8.2 | (13) | 8.8 |
| Example V | | | | | | | | |
| Feed mixture | 1000.0 | 17.40 | 28.12 | 2.08 | 4.51 | 25.79 | 1.6 | 17.75 |
| Shaft product | 100.00 | 20.23 | 32.91 | 20.08 | 3.18 | 7.01 | (12.15) | 21.68 |
| Matte-1 | 25.54 | 75.01 | 2.33 | (0.88) | 1.75 | 20.31 | 0.5 | 0.08 |
| Slag-1 | 71.42 | 1.51 | 45.24 | 7.55 | 3.83 | 0.49 | (14.8) | 30.33 |
| Sedimentation | 121.5 | 20.4 | 33.1 | 22.1 | 3.2 | 5.4 | (13) | 21.8 |
| Matte-2 | 188.2 | 73.84 | 3.11 | (0.86) | 1.81 | 20.48 | 0.49 | 0.08 |
| Slag-2 | 549.7 | 2.82 | 44.63 | 9.01 | 3.80 | 0.35 | (14.9) | 30.08 |
| Flying dust | 106.8 | 18.3 | 28.1 | (18.8) | 19.5 | 4.0 | (15) | 11.3 |
| Example VI | | | | | | | | |
| Feed mixture | 1000.0 | 17.53 | 28.53 | 2.18 | 4.10 | 25.26 | 2.0 | 17.71 |
| Shaft product -1 | 100.0 | 20.27 | 32.96 | 20.62 | 3.19 | 6.52 | (12.5) | 22.06 |
| Matte-1 | 24.79 | 76.55 | 1.76 | (0.95) | 1.22 | 19.24 | 0.55 | 0.40 |
| Slag-1 | 72.13 | 1.79 | 45.09 | 7.89 | 4.00 | 0.30 | (15.0) | 30.45 |
| Sedimentation | (34.9) | (19.3) | (34.6) | (21.4) | (3.0) | (6.7) | (12) | (21.0) |
| Matte-2 | 194.2 | 75.51 | 1.93 | (0.52) | 1.35 | 20.72 | 0.29 | 0.19 |
| Slag-2 | 527.5 | 0.61 | 45.49 | 5.69 | 3.97 | 1.22 | (14.3) | 30.87 |
| Flying dust | 130.4 | 19.5 | 31.9 | (21.2) | 13.4 | 5.0 | (14.9) | 10.7 |
| Shaft product | (743) | (20.2) | (32.8) | | (3.2) | (7.7) | (11.6) | (22.0) |

| Balance component | Amount kg/tn, % | Weighted analyses | | | | | | | |
|---|---|---|---|---|---|---|---|---|---|
| | | Ni | Cu | Fe | $Fe^{+3}$ | Me | S | O | $SiO_2$ |
| Example VII | | | | | | | | | |
| Feed mixture | 1000.0 | 2.32 | 0.13 | 27.44 | 24.74 | 0.16 | 1.04 | 11.6 | 21.65 |
| Shaft product -1 | 100.00 | 2.63 | 0.15 | 31.09 | 16.58 | 0.18 | 0.90 | (12.17) | 24.83 |
| Shaft product -2 | 100.00 | 2.67 | 0.15 | 31.49 | (14.30) | 0.19 | 3.06 | (10.29) | 25.15 |
| Matte -2 | 29.50 | 65.09 | 2.88 | 4.91 | (0.52) | 0.30 | 26.19 | 0.30 | 0.20 |
| Slag -2 | 76.00 | 0.46 | 0.06 | 35.07 | 2.19 | 0.20 | 0.95 | (10.1) | 28.20 |
| Sedimentation | 129.1 | 2.7 | 0.2 | 31.5 | 17.2 | 0.2 | 2.2 | (11) | 25.1 |
| Matte -3 | 243.3 | 62.11 | 2.80 | 7.22 | (0.56) | 0.32 | 26.87 | 0.32 | 0.21 |
| Slag -3 | 674.5 | 0.74 | 0.07 | 34.87 | 3.12 | 0.20 | 0.87 | (10.3) | 28.05 |
| Flying dust | 115.8 | 2.7 | 0.1 | 32.4 | (14.9) | 0.2 | 2.9 | (11) | 23.6 |
| Example VIII | | | | | | | | | |
| Feed mixture | 1000.0 | 2.32 | 0.13 | 27.47 | 24.33 | 0.16 | 1.10 | 11.5 | 21.96 |
| Shaft product -2 | 100.00 | 2.67 | 0.15 | 31.49 | (14.30) | 0.19 | 3.06 | (10.29) | 25.15 |
| Sedimentation | 50.3 | 2.7 | 0.2 | 31.4 | 15.3 | 0.2 | 2.2 | (11) | 25.1 |
| Matte -3 | 247.6 | 63.79 | 2.76 | 6.04 | (0.53) | 0.30 | 26.46 | (0.30) | 0.20 |
| Slag -3 | 650.1 | 0.56 | 0.07 | 35.00 | 2.39 | 0.20 | 0.89 | 10.1 | 28.14 |
| Flying dust | 145.3 | 2.6 | 0.1 | 31.4 | (14.4) | 0.2 | 2.9 | (10) | 25.28 |
| Example IX | | | | | | | | | |
| Feed mixture | 1000.0 | | 18.06 | 19.21 | 17.70 | 1.01 | 0.53 | 12.1 | 30.80 |

Table 2.-continued

| | | | | | | | | |
|---|---|---|---|---|---|---|---|---|
| Shaft product -1 | 100.00 | 19.60 | 20.36 | 13.57 | 1.09 | — | (10.51) | 33.05 |
| Shaft product -2 | 100.00 | 19.14 | 19.88 | (8.51) | 1.07 | 6.04 | (6.47) | 32.27 |
| Matte -2 | 22.89 | 77.50 | 2.08 | (0.52) | 0.10 | 19.72 | 0.30 | 0.20 |
| Slag -2 | 70.70 | 0.37 | 25.78 | 3.23 | 1.39 | 0.92 | (7.8) | 42.88 |
| Sedimentation | 117.8 | 19.9 | 19.7 | 10.2 | 1.1 | 4.4 | (7.5) | 32.7 |
| Matte -3 | 185.3 | 77.48 | 2.09 | (0.57) | 0.11 | 19.66 | 0.33 | 0.22 |
| Slag -3 | 644.1 | 2.58 | 25.23 | 3.53 | 1.36 | 1.01 | (7.7) | 41.87 |
| Flying dust | 124.0 | 18.5 | 18.7 | (10.6) | 1.0 | 4.2 | (7.1) | 33.9 |
| Example X | 1000.0 | 18.12 | 18.82 | 16.87 | 1.01 | 0.79 | 11.9 | 30.81 |
| Shaft product -2 | 100.00 | 19.14 | 19.88 | (8.51) | 1.07 | 6.04 | (6.47) | 32.27 |
| Sedimentation | 38.8 | 19.2 | 20.0 | 6.9 | 1.1 | 5.2 | 7.0 | 32.4 |
| Matte -3 | 196.4 | 77.65 | 2.00 | (0.51) | 0.10 | 19.65 | 0.29 | 0.20 |
| Slag -3 | 613.6 | 0.54 | 25.75 | 3.35 | 1.38 | 0.93 | (7.8) | 42.77 |
| Flying dust | 155.0 | 18.7 | 19.5 | (6.7) | 1.1 | 5.1 | (6.9) | 33.3 |
| Example XI | | | | | | | | |
| Feed mixture | 1000.0 | 18.22 | 29.67 | 0.06 | 2.86 | 29.92 | — | 14.73 |
| Shaft product | 100.00 | 21.14 | 34.67 | 17.11 | 2.42 | 10.93 | (10.2) | 17.28 |
| Sedimentation | 169.9 | 21.5 | 35.3 | 20.3 | 2.5 | 8.6 | (12.0) | 17.6 |
| Matte -2 | 290.7 | 52.54 | 20.41 | (4.28) | 1.69 | 22.32 | 2.46 | 0.30 |
| Slag -2 | 449.3 | 2.28 | 45.08 | 8.32 | 2.98 | 1.54 | (14.3) | 28.67 |
| Flying dust | 96.9 | 19.5 | 29.7 | (18.4) | 10.2 | 8.5 | (12) | 14.2 |
| Example XII | | 21.36 | 35.08 | 18.12 | 2.44 | 10.38 | (10.8) | 17.50 |
| Matte -2 | 294.0 | 56.98 | 16.22 | (3.49) | 2.04 | 21.91 | 2.00 | 0.51 |
| Slag -2 | 480.0 | 0.48 | 48.18 | 4.85 | 2.80 | 1.58 | (14.4) | 28.68 |
| Flying dust | 65.0 | 19.0 | 27.3 | (15.6) | 14.2 | 9.5 | (11) | 12.5 |
| Example XIII | | | | | | | | |
| Feed mixture | 1000.0 | 18.22 | 29.67 | 0.06 | 2.86 | 29.92 | — | 14.73 |
| Shaft product | 100.00 | 21.28 | 34.91 | 18.57 | 2.53 | 9.84 | (11.1) | 17.43 |
| Matte -2 | 284.0 | 60.00 | 13.77 | (2.97) | 1.97 | 21.69 | 1.70 | 0.34 |
| Slag -2 | 505.0 | 0.45 | 48.35 | 4.95 | 2.96 | 1.39 | (14.6) | 27.89 |
| Flying dust | 50.0 | 19.0 | 26.9 | (16.4) | 16.2 | 8.5 | (12) | 11.0 |
| Example XIV | | | | | | | | |
| Shaft product | 100.00 | 21.31 | 35.19 | 17.69 | 1.59 | 11.05 | (10.2) | 17.45 |
| Matte -2 | 302.0 | 53.00 | 20.09 | (4.10) | 1.80 | 22.47 | 2.35 | 0.20 |
| Slag -2 | 440.5 | 0.50 | 47.08 | 4.34 | 1.52 | 1.50 | (13.8) | 30.05 |
| Flying dust | 105.7 | 18.8 | 27.0 | (16.9) | 15.62 | 8.00 | (12) | 13.5 |

What is claimed is:

1. In an improved suspension smelting furnace for the suspension smelting of finely-grained oxide or sulfide ores and concentrates, and of the type having
    (1) as a base a horizontal lower furnace comprising a main smelt reaction zone and a settling zone;
    (2) at least one vertical suspension reaction zone communicating at its lower end with the horizontal lower furnace;
    (3) at least one vertical rising-flow zone communicating at its lower end with the horizontal lower furnace;
    (4) means attached to the upper end of the suspension reaction zone for the production of a suspension of finely-grained oxide and/or sulfide ores or concentrates with air, oxygen or both, and for feeding this suspension downwards in the reaction zone;
    wherein said main smelt reaction zone in the lower furnace is under the suspension reaction zone in which main smelt reaction zone the bulk of the suspension is adapted to be dissolved vertically in the smelt accumulated in the lower furnace main smelt reaction zone;
    (5) and means attached to the upper end of the rising-flow zone for withdrawing the residual suspension, the improvement comprising:
    said horizontal lower furnace which includes 3 zones (a), (b) and (c) wherein
    (a) is the main smelt reaction zone disposed under said suspension reaction zone;
    (b) is a secondary smelt reaction zone in the lower furnace which is disposed under said rising-flow zone, wherein the residual suspension is allowed to at least partially dissolve in the smelt before essentially all undissolved residual suspension is fed into the rising-flow zone;
    (c) is the smelt settling zone in the horizontal lower furnace communicating at least through the smelt with the main and secondary smelt reaction zones for the separation of slag from matte and metal, and comprising means for withdrawing slag, metal, and matte from the horizontal lower furnace, in which the main smelt reaction zone is placed in close proximity to the rising-flow zone in order to minimize the area of the secondary smelt reaction zone so that the retention time of the residual suspension in the horizontal lower furnace is minimized; and
    (d) two vertical shafts, each of which is connected at its lower end with the horizontal lower furnace, (i) one of said two vertical shafts encompassing the reaction zone of (2) and (ii) the other of said two vertical shafts encompassing the rising-flow zone of (3), wherein (ii) is disposed concentrically inside (i) in an arrangement wherein a cross-section of that arrangement is ring-shaped.

2. In an improved suspension smelting furnace for the suspension smelting of finely-grained oxide or sulfide ores and concentrates, and of the type having
    (1) as a base a horizontal lower furnace comprising a main smelt reaction zone and a settling zone;
    (2) at least one vertical suspension reaction zone communicating at its lower end with the horizontal lower furnace;
    (3) at least one vertical rising-flow zone communicating at its lower end with the horizontal lower furnace;
    (4) means attached to the upper end of the suspension reaction zone for the production of a suspension of finely-grained oxide and/or sulfide ores or concentrates with air, oxygen or both, and for feeding this suspension downwards in the reaction zone;
    wherein said main smelt reaction zone in the lower furnace is under the suspension reaction zone and in which main smelt reaction zone the bulk of the suspension is adapted to be dissolved vertically in the smelt accumulated in the lower furnace main smelt reaction zone;

(5) and means attached to the upper end of the rising-flow zone for withdrawing the residual suspension, the improvement comprising;

said horizontal lower furnace which includes 3 zones (a), (b) and (c) wherein (a) is the main smelt reaction zone disposed under said suspension reaction zone;

(b) is a secondary smelt reaction zone in the lower furnace which is disposed under said rising-flow zone, wherein the residual suspension is allowed to at least partially dissolve in the smelt before essentially all undissolved residual suspension is fed into the rising-flow zone;

(c) is the smelt settling zone in the horizontal lower furnace communicating at least through the smelt with the main and secondary smelt reaction zones for the separation of slag from matte and metal, and comprising means for withdrawing slag, metal, and matte from the horizontal lower furnace, in which the main smelt reaction zone is placed in close proximity to the rising-flow zone in order to minimize the area of the secondary smelt reaction zone so that the retention time of the residual suspension in the horizontal lower furnace is minimized; and (d) two vertical shafts, each of which is connected at its lower end with the horizontal lower furnace, (i) one of said two vertical shafts encompassing the reaction zone of (2) and (ii) the other of said two vertical shafts encompassing the rising-flow zone of (3), wherein (ii) is disposed concentrically about (i) in an arrangement wherein a cross-section of the arrangement is ring-shaped.

* * * * *